(12) United States Patent
Kalevi Makela et al.

(10) Patent No.: US 11,326,519 B2
(45) Date of Patent: May 10, 2022

(54) FRAME FOR A HEAT ENGINE

(71) Applicant: General Electric Company, Schenectady, NY (US)

(72) Inventors: Matti Veikko Kalevi Makela, Boston, MA (US); Emilio Eramo, Peabody, MA (US); Christopher Lloyd McKenzie, Arlington, MA (US); Apostolos Pavlos Karafillis, Winchester, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 113 days.

(21) Appl. No.: 16/800,375

(22) Filed: Feb. 25, 2020

(65) Prior Publication Data

US 2021/0262386 A1    Aug. 26, 2021

(51) Int. Cl.
| | |
|---|---|
| *F02C 7/12* | (2006.01) |
| *F01D 25/14* | (2006.01) |
| *F01D 25/16* | (2006.01) |
| *F01D 9/02* | (2006.01) |

(52) U.S. Cl.
CPC ............. *F02C 7/12* (2013.01); *F01D 9/023* (2013.01); *F01D 25/14* (2013.01); *F01D 25/162* (2013.01); *F05D 2220/323* (2013.01); *F05D 2220/50* (2013.01); *F05D 2230/31* (2013.01); *F05D 2260/213* (2013.01)

(58) Field of Classification Search
CPC .... F02C 7/047; F02C 7/12; F02C 7/04; F02C 7/24; F02C 3/04; B64D 27/12; B64D 33/02; F01D 25/10; F01D 25/145; F01D 25/26; F04D 29/522; F04D 29/584
See application file for complete search history.

(56) References Cited

U.S. PATENT DOCUMENTS

| | | |
|---|---|---|
| 2,812,899 A | 11/1957 | Meschino |
| 2,938,333 A | 5/1960 | Wetzler |
| 3,478,820 A | 11/1969 | Huber |
| 3,981,466 A | 9/1976 | Shah |
| 4,077,739 A | 3/1978 | Heilenbach |
| 4,302,941 A | 12/1981 | DuBell |
| 4,505,445 A | 3/1985 | Allison |
| 4,542,623 A | 9/1985 | Hovan et al. |

(Continued)

FOREIGN PATENT DOCUMENTS

| | | |
|---|---|---|
| EP | 1013895 A2 | 6/2000 |
| EP | 1013895 A3 | 6/2002 |

(Continued)

*Primary Examiner* — Craig Kim

(74) *Attorney, Agent, or Firm* — Venable LLP; Peter T. Hrubiec; Michele V. Frank

(57) ABSTRACT

A frame for a heat engine, the frame including an inner wall extended from an inlet end to an outlet end, the inner wall forming at least in part a core flowpath, the inner wall comprising a plenum formed between an outer portion of the inner wall and an inner portion of the inner wall, wherein a cavity is formed inward of the inner portion of the inner wall, and wherein the inner wall includes a first plenum opening providing fluid communication between the cavity and the plenum, and wherein the inner wall comprises a second plenum opening providing fluid communication between the plenum and the core flowpath.

19 Claims, 15 Drawing Sheets

(56) References Cited

U.S. PATENT DOCUMENTS

| | | | |
|---|---|---|---|
| 4,860,534 A * | 8/1989 | Easley | F02C 7/052 |
| | | | 60/39.092 |
| 5,228,643 A | 7/1993 | Manda et al. | |
| 6,134,874 A | 10/2000 | Stolen | |
| 6,149,074 A | 11/2000 | Friedel et al. | |
| 6,623,238 B2 | 9/2003 | Langston et al. | |
| 6,681,578 B1 | 1/2004 | Bunker | |
| 6,761,031 B2 | 7/2004 | Bunker et al. | |
| 7,497,220 B2 | 3/2009 | Asplund et al. | |
| 7,762,087 B2 | 7/2010 | Somanath et al. | |
| 7,900,437 B2 | 3/2011 | Venkataramani et al. | |
| 7,967,560 B2 | 6/2011 | DiBenedetto | |
| 8,015,788 B2 | 9/2011 | Stephenson et al. | |
| 8,092,169 B2 | 1/2012 | Cloft et al. | |
| 8,245,952 B2 | 8/2012 | de la Bruere-Terreault et al. | |
| 8,272,220 B2 | 9/2012 | Haehnle et al. | |
| 8,444,093 B1 | 5/2013 | Epstein | |
| 8,499,566 B2 | 8/2013 | Lacy et al. | |
| 8,544,277 B2 | 10/2013 | Johnson et al. | |
| 8,549,861 B2 | 10/2013 | Huffman | |
| 8,894,359 B2 | 11/2014 | Munshi et al. | |
| 9,028,618 B2 | 5/2015 | Battaglioli et al. | |
| 9,097,140 B2 | 8/2015 | Hussain | |
| 9,121,491 B2 | 9/2015 | Hancox | |
| 9,657,593 B2 | 5/2017 | Todorovic | |
| 9,777,636 B2 | 10/2017 | Morrill | |
| 9,802,711 B2 | 10/2017 | Bruce et al. | |
| 9,816,396 B2 | 11/2017 | Mickelsen et al. | |
| 9,874,108 B2 | 1/2018 | Griffiths et al. | |
| 9,879,637 B2 | 1/2018 | Knowles et al. | |
| 9,970,355 B2 | 5/2018 | Maurer et al. | |
| 10,024,189 B2 | 7/2018 | Danescu et al. | |
| 10,082,079 B2 | 9/2018 | Todorovic et al. | |
| 10,087,778 B2 | 10/2018 | Didion et al. | |
| 10,190,598 B2 | 1/2019 | Veitch et al. | |
| 10,233,841 B2 | 3/2019 | Bintz et al. | |
| 2002/0047070 A1 | 4/2002 | Breer et al. | |
| 2007/0234704 A1 | 10/2007 | Moniz et al. | |
| 2009/0165995 A1 | 7/2009 | Bajusz et al. | |
| 2011/0131945 A1 | 6/2011 | Vauchel et al. | |
| 2012/0091285 A1 | 4/2012 | Porte et al. | |
| 2012/0251373 A1 | 10/2012 | Bajusz et al. | |
| 2013/0283757 A1 | 10/2013 | Bordne et al. | |
| 2014/0369812 A1 | 12/2014 | Caruel et al. | |
| 2015/0086352 A1 | 3/2015 | Eleftheriou | |
| 2015/0139798 A1 | 5/2015 | Duke et al. | |
| 2015/0291284 A1 | 10/2015 | Victor et al. | |
| 2015/0330249 A1 | 11/2015 | Budnick | |
| 2016/0032763 A1 | 2/2016 | Grogg et al. | |
| 2016/0039528 A1 | 2/2016 | Caruel | |
| 2016/0131036 A1 | 5/2016 | Bintz et al. | |
| 2016/0230993 A1 | 8/2016 | Dai et al. | |
| 2017/0081020 A1 | 3/2017 | Pujar et al. | |
| 2018/0016917 A1 | 1/2018 | Tailman et al. | |
| 2018/0016982 A1 | 1/2018 | Wotzak | |
| 2018/0034350 A1 | 2/2018 | Shinde | |
| 2018/0038280 A1 | 2/2018 | Rogero et al. | |
| 2018/0229850 A1 | 8/2018 | Menheere et al. | |
| 2018/0306060 A1 | 10/2018 | Ranjan | |
| 2018/0313227 A1 | 11/2018 | Wilson et al. | |
| 2019/0093505 A1 | 3/2019 | Escriche et al. | |
| 2019/0093559 A1 | 3/2019 | Bunel et al. | |

FOREIGN PATENT DOCUMENTS

| | | |
|---|---|---|
| EP | 1760291 A2 | 3/2007 |
| WO | WO2014/020770 A1 | 2/2014 |
| WO | WO2018/013642 A1 | 1/2018 |

* cited by examiner

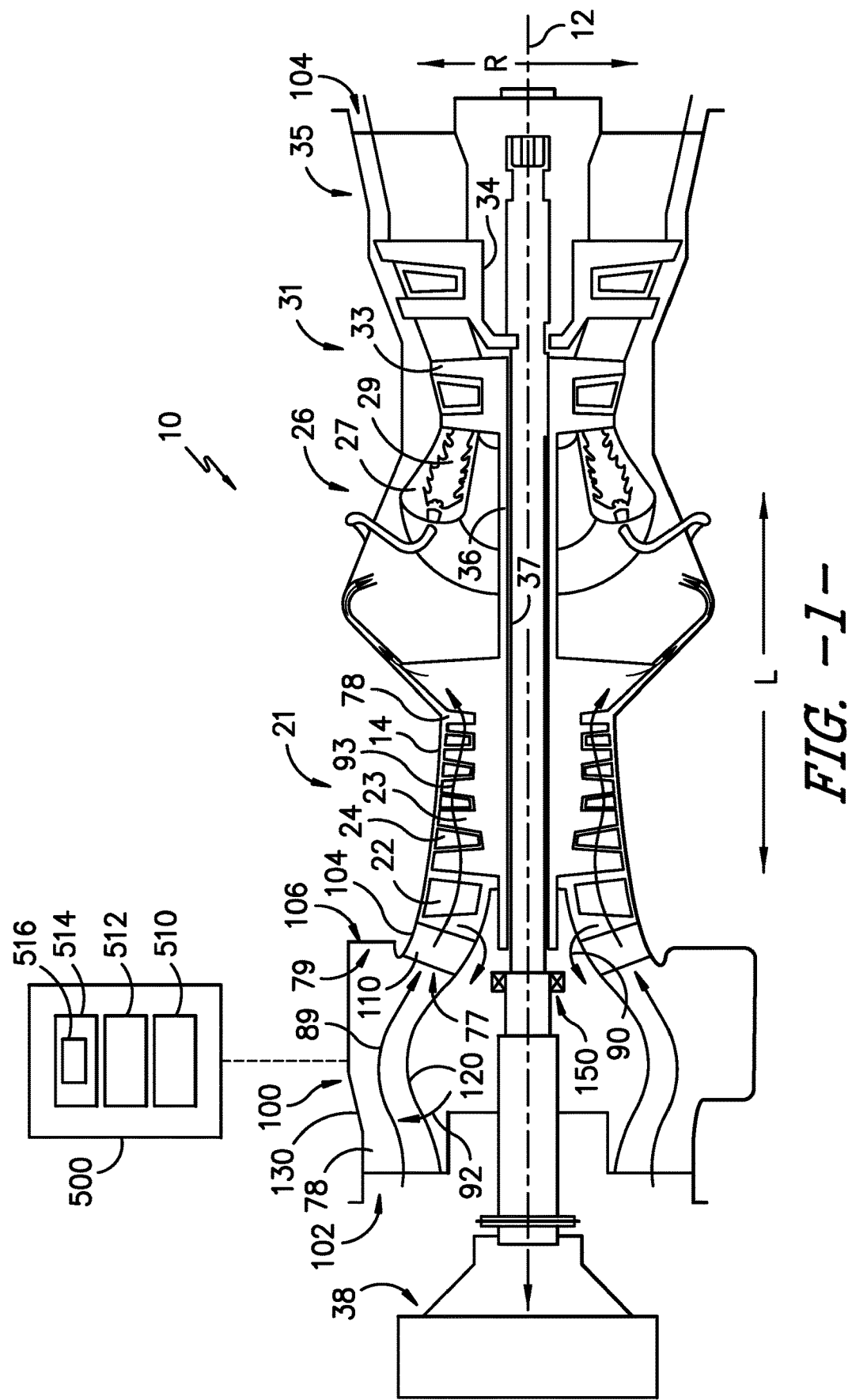
FIG. -1-

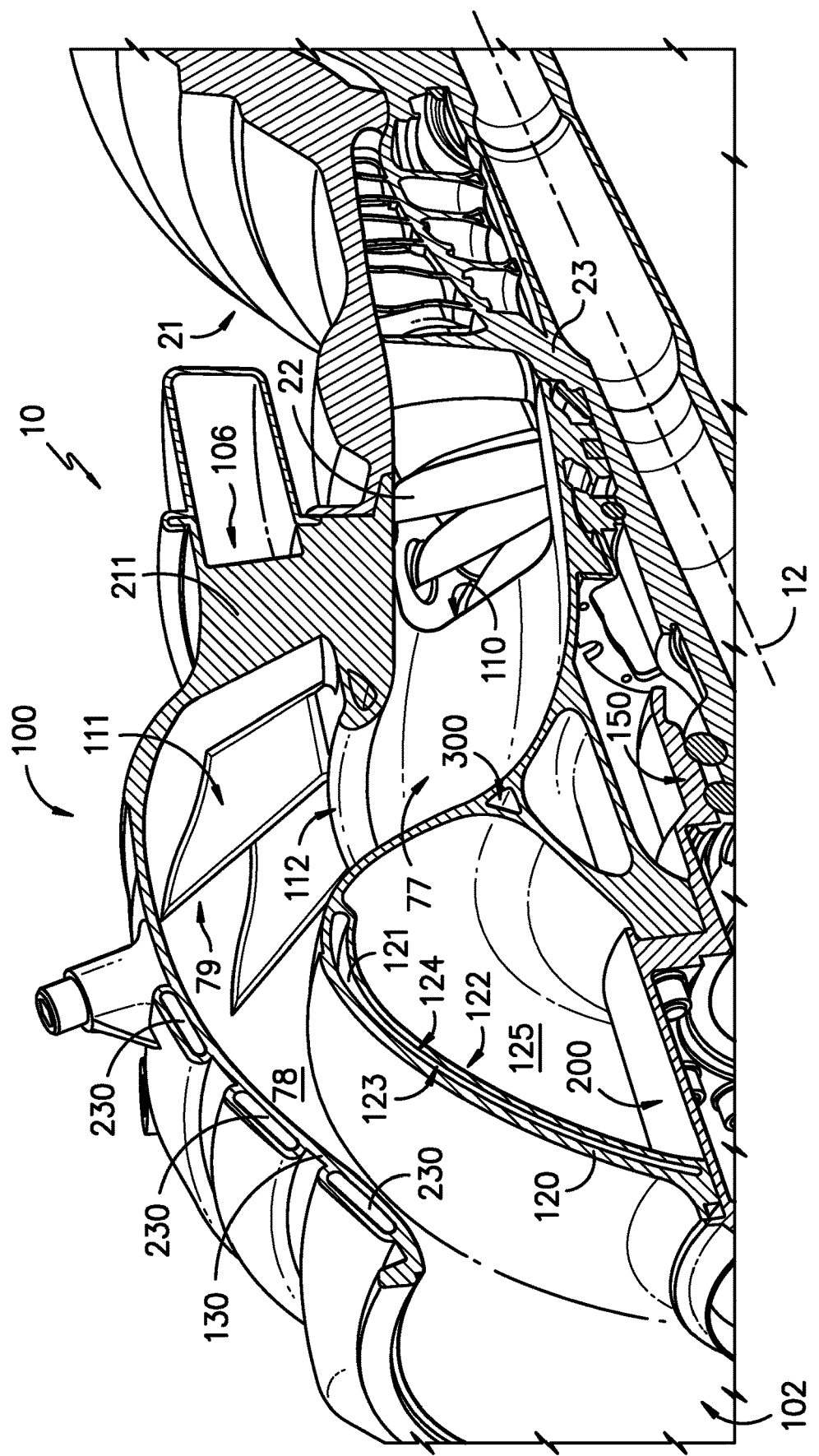
FIG. -2-

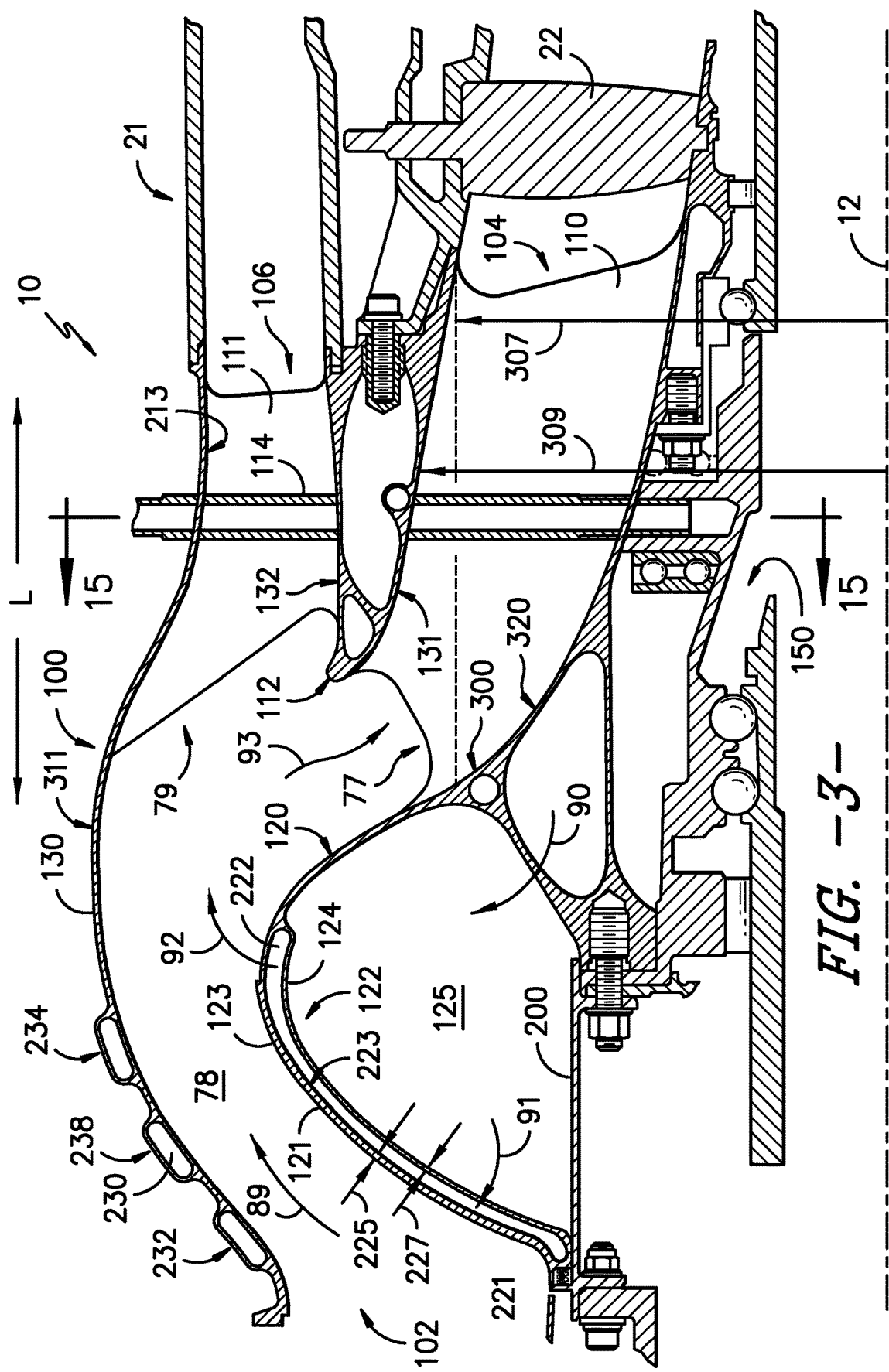
FIG. -3-

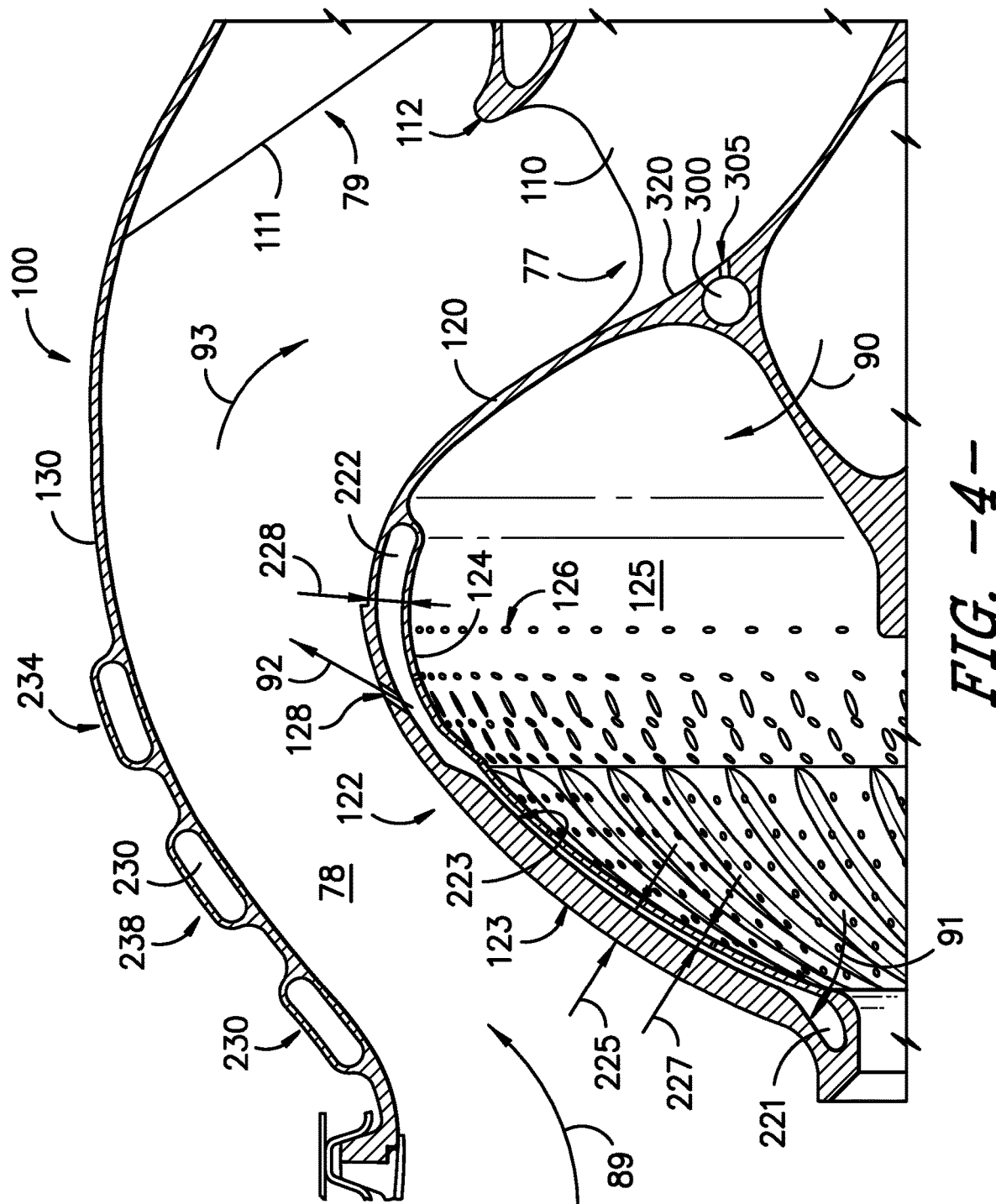
FIG. -4-

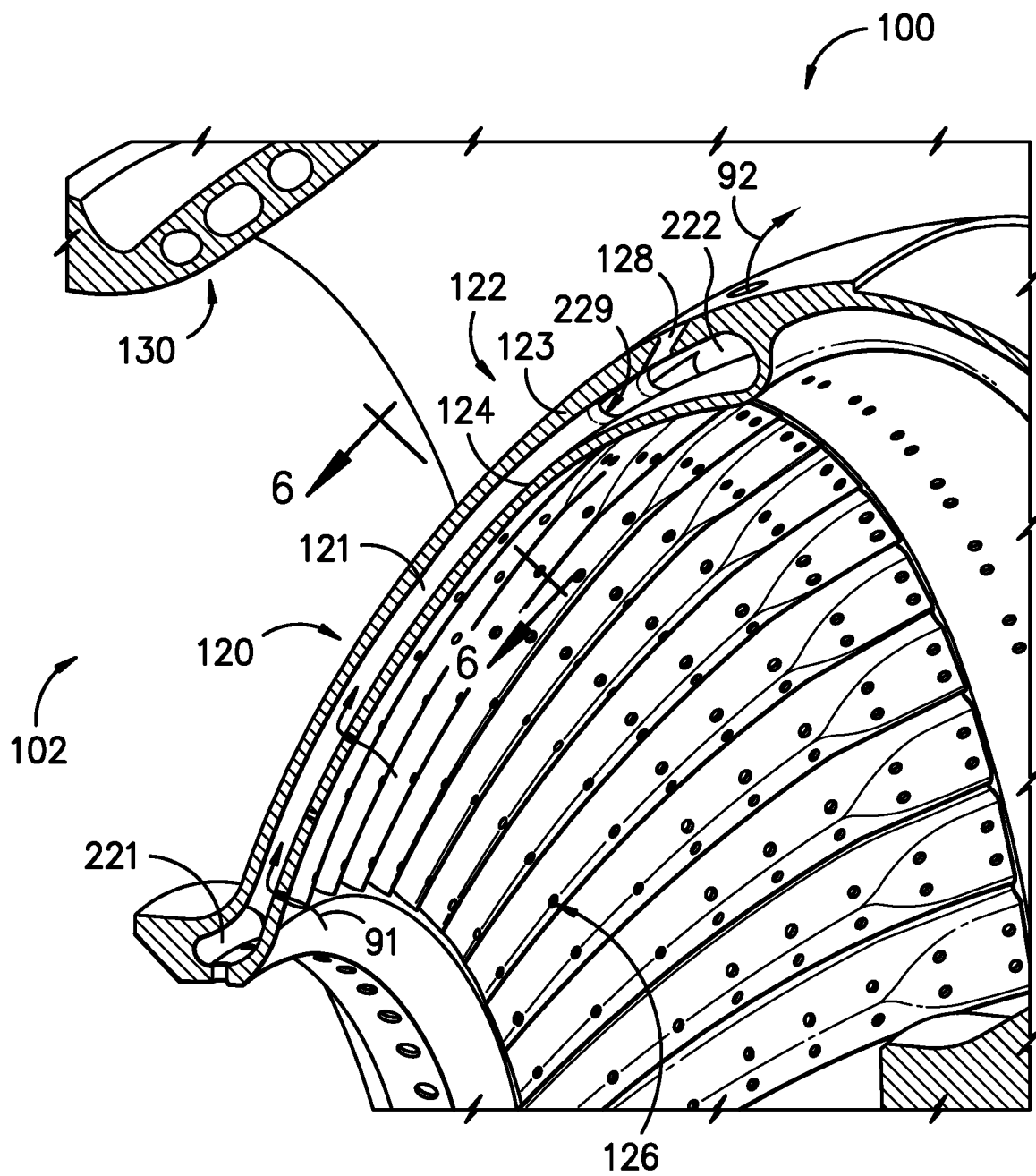
FIG. -5-

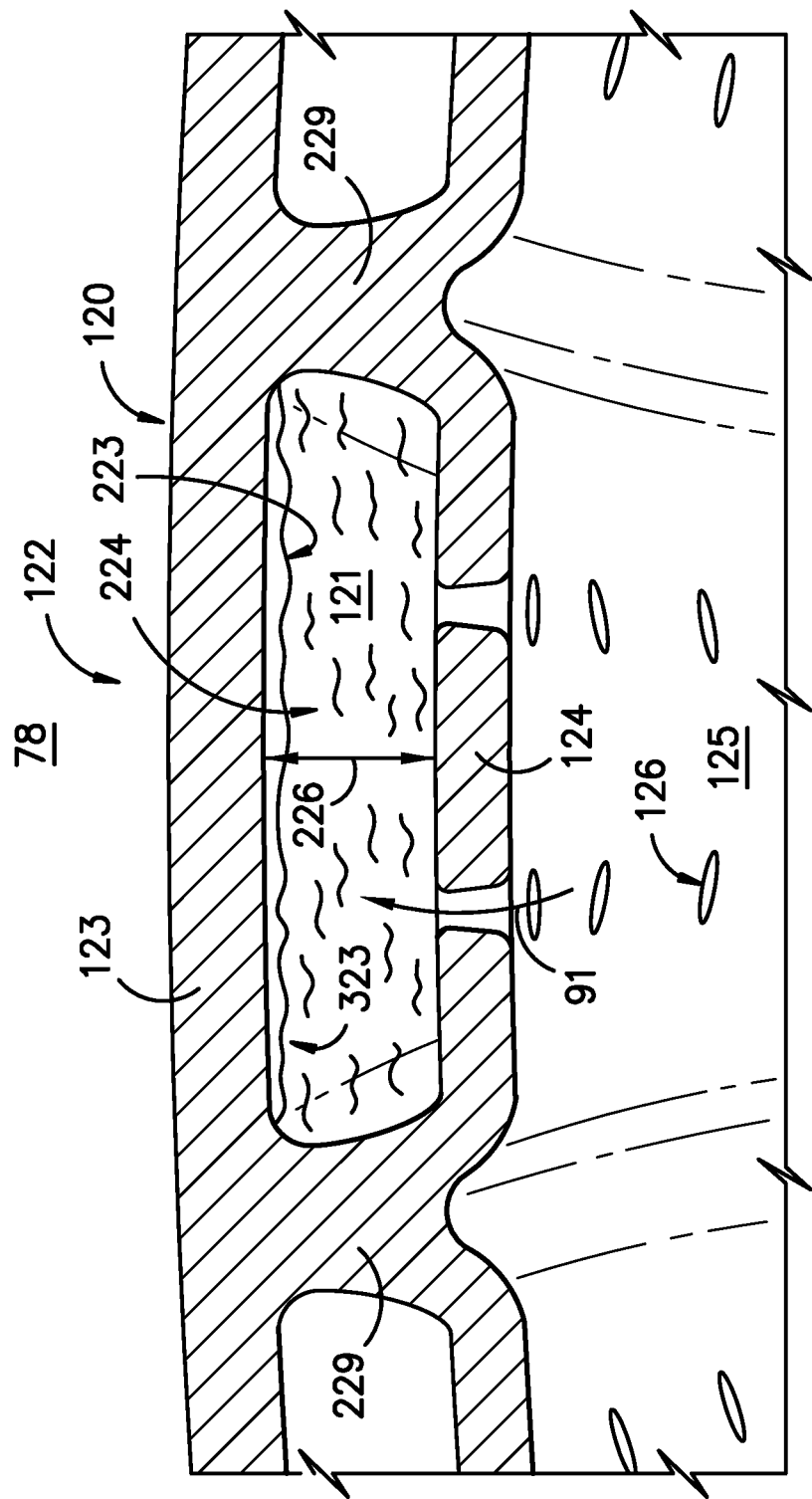

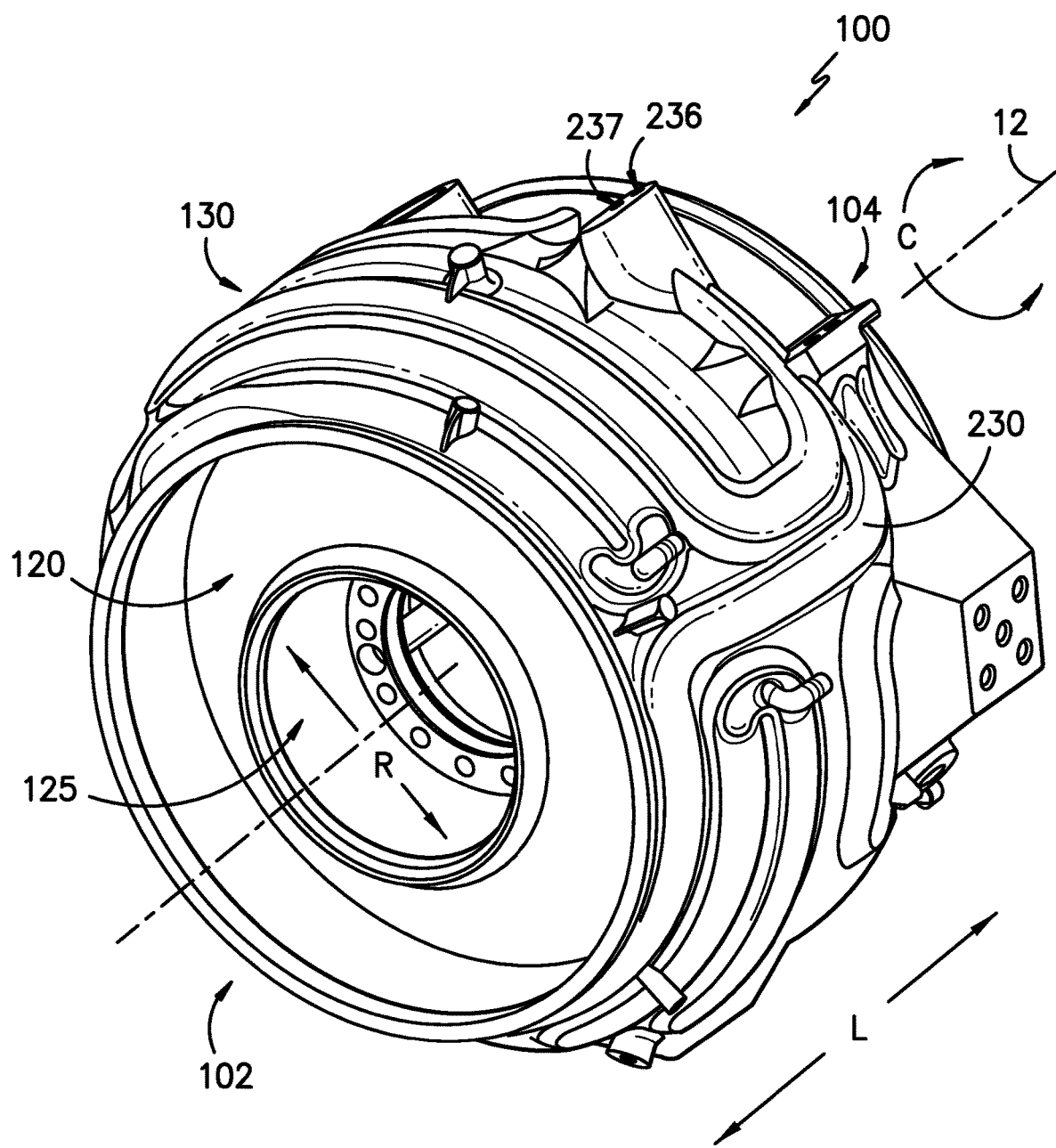
FIG. -7-

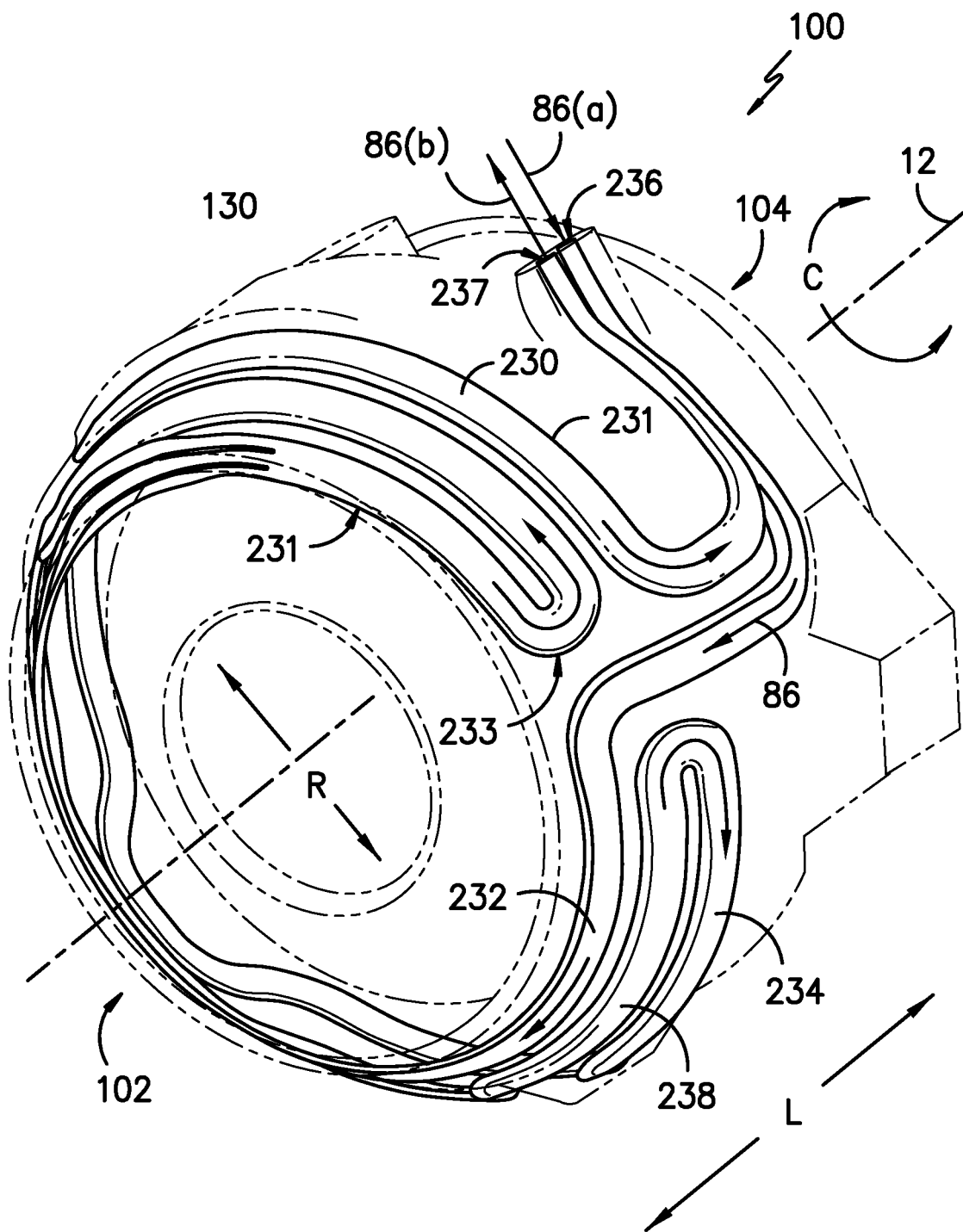
FIG. -8-

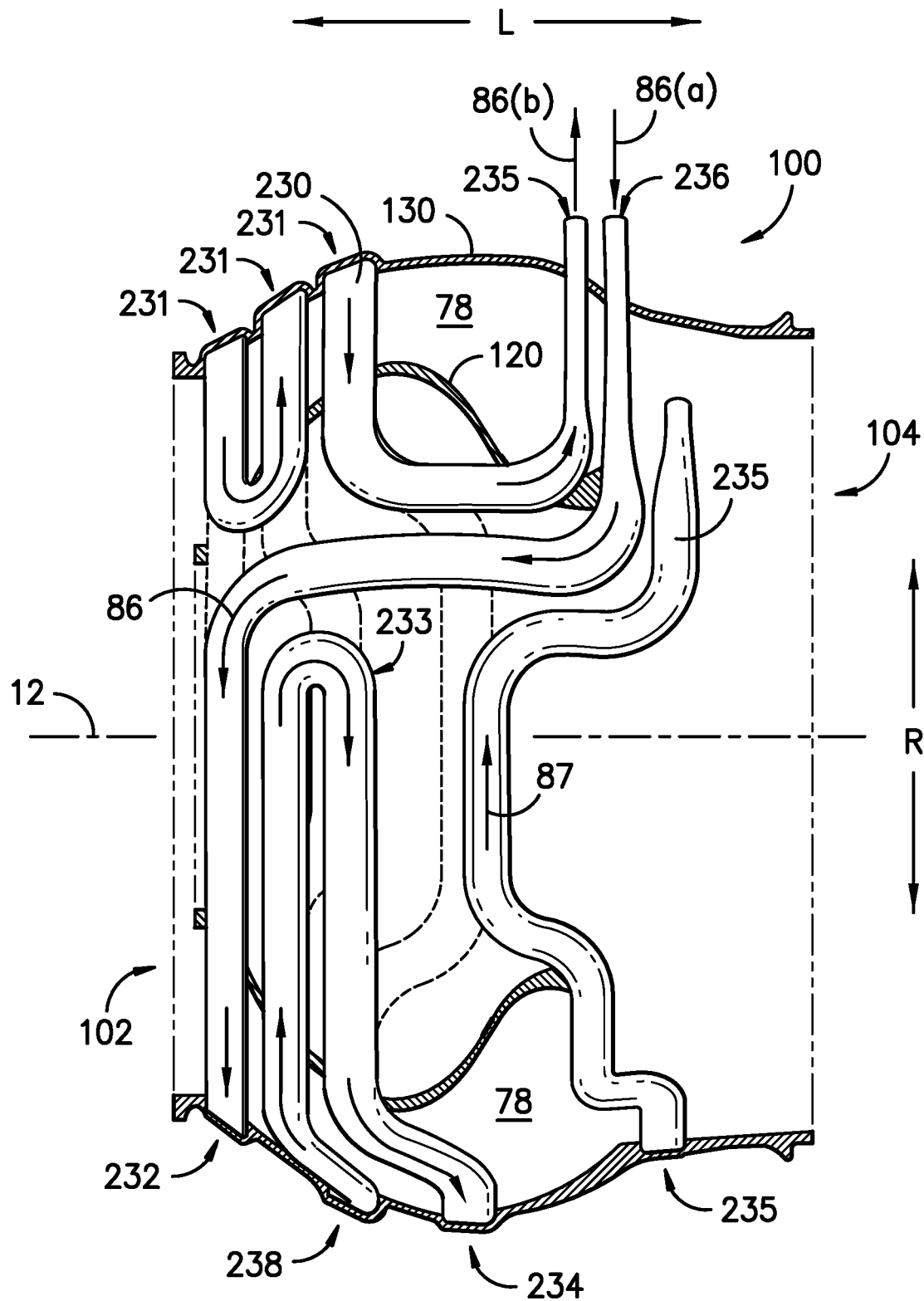
FIG. -9-

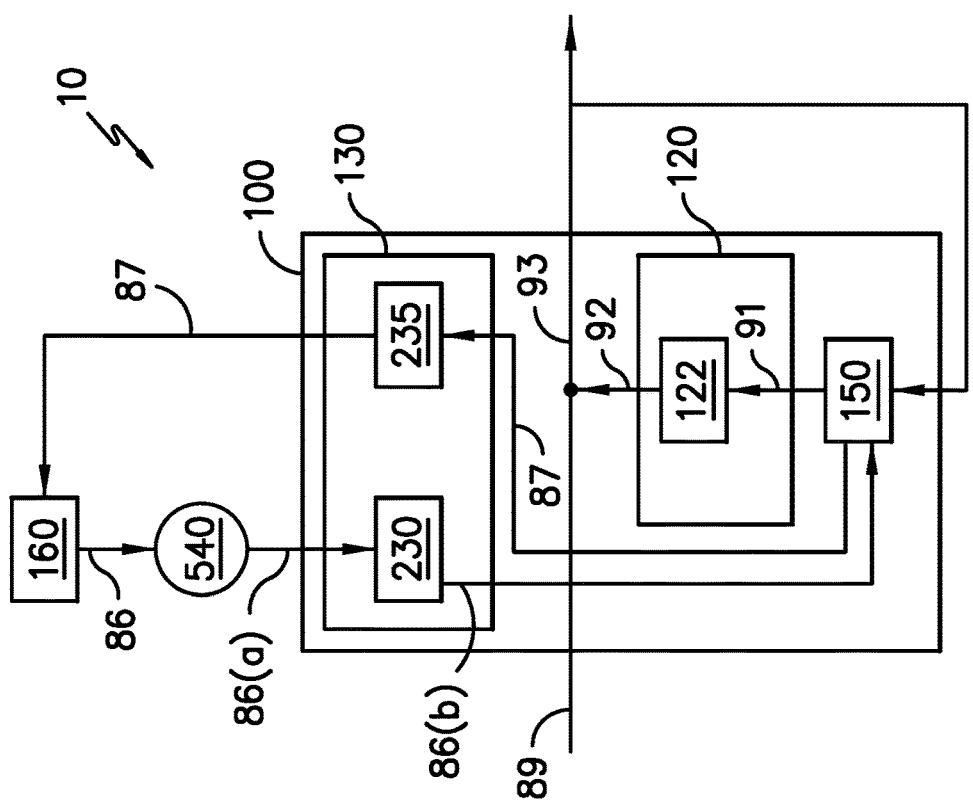
FIG. -11-
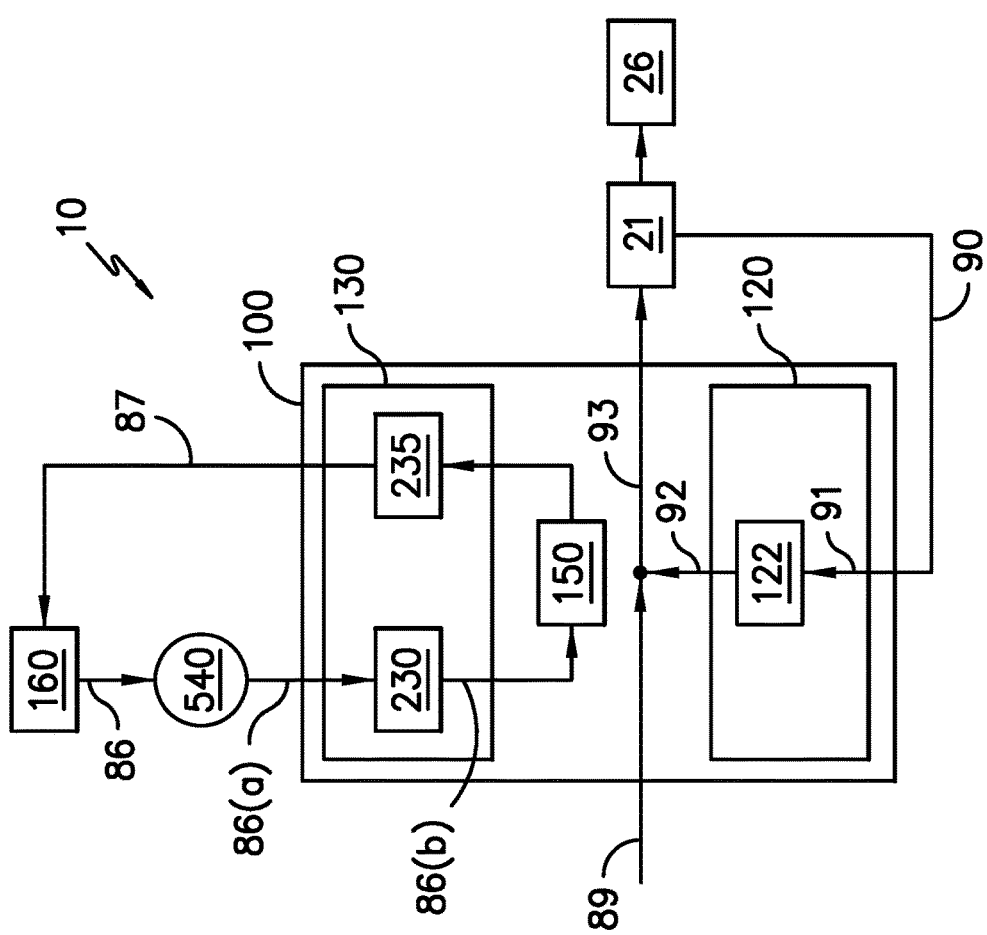
FIG. -10-

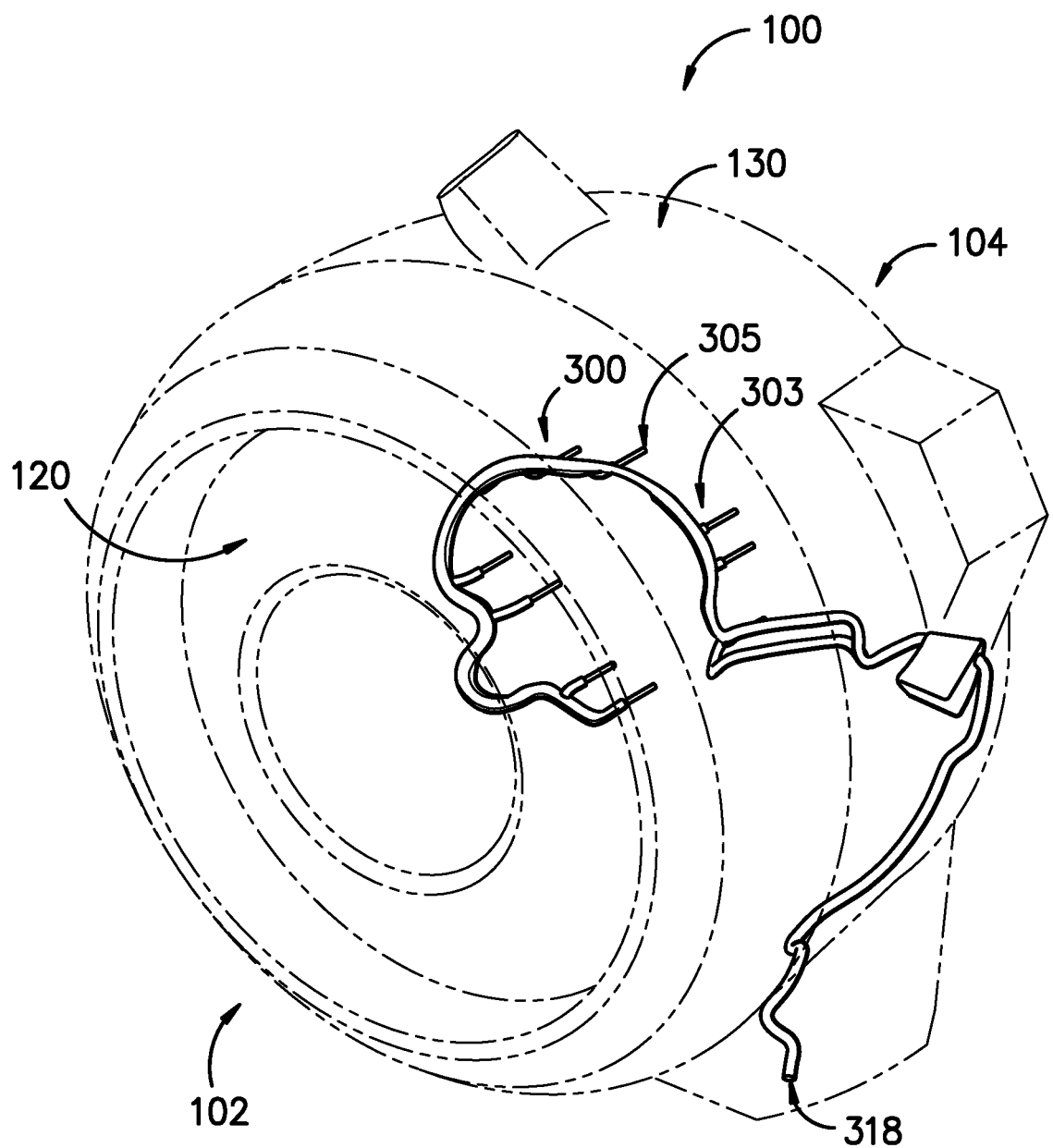
FIG. -12-

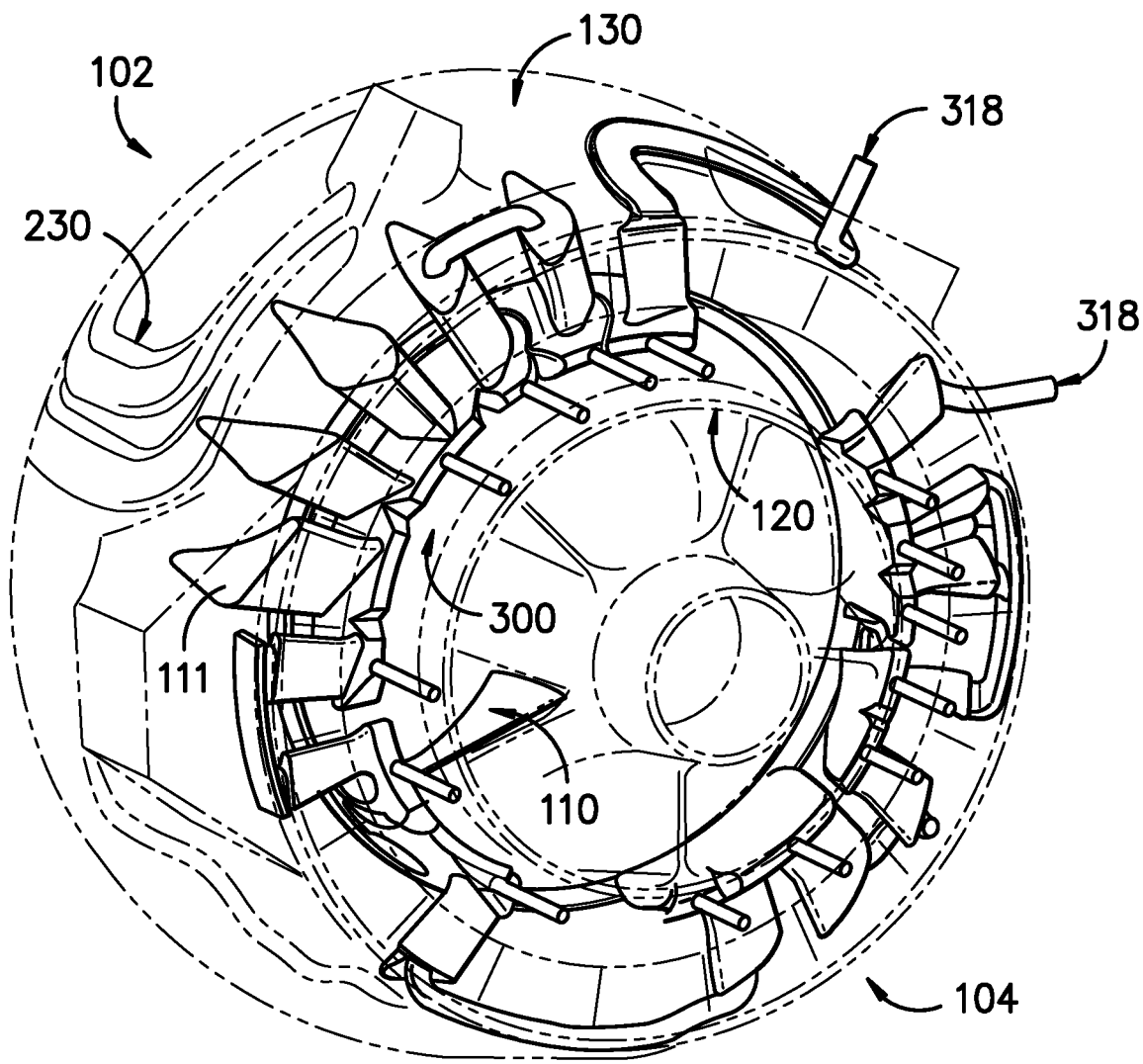
FIG. -13-

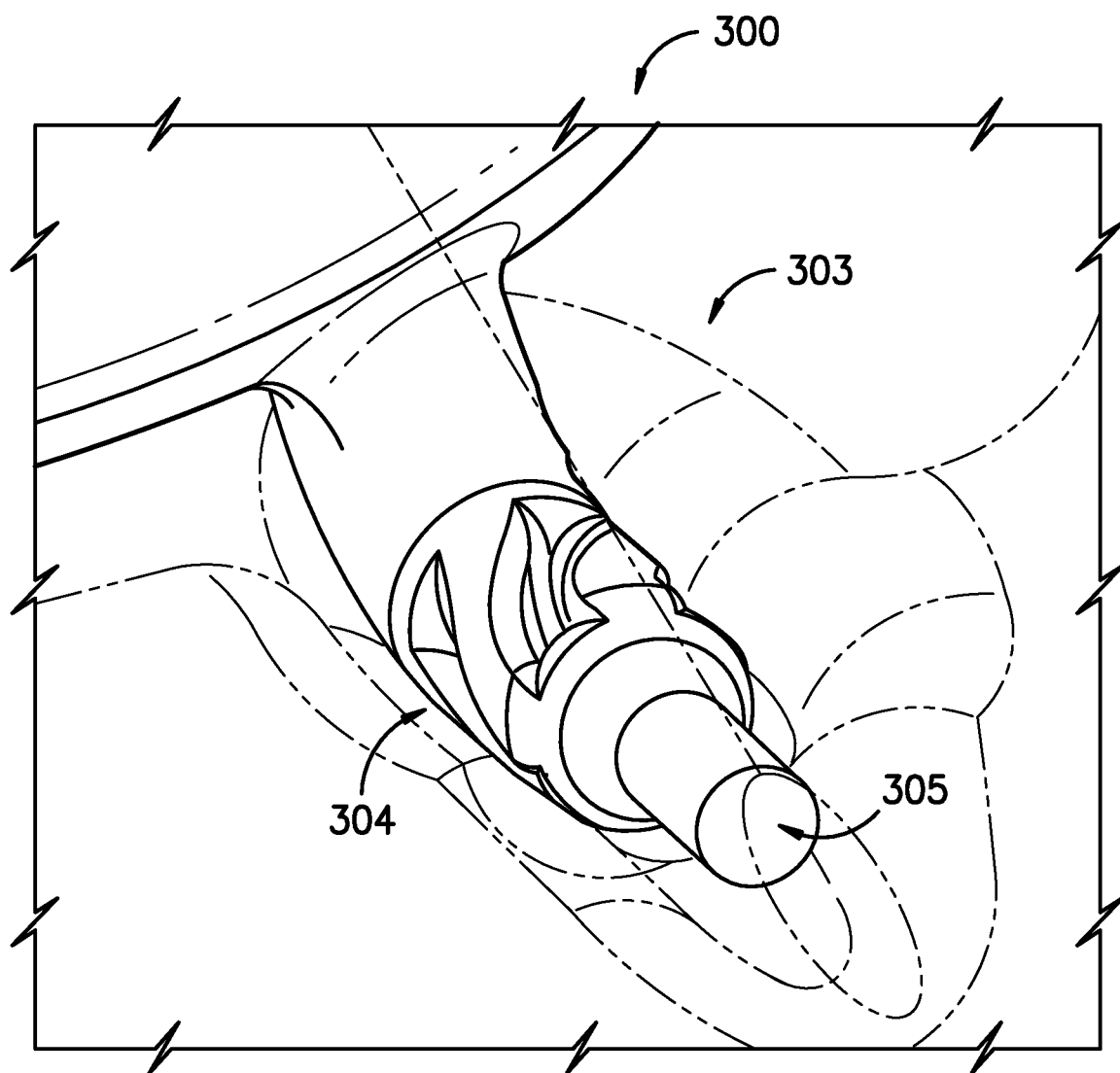
FIG. -14-

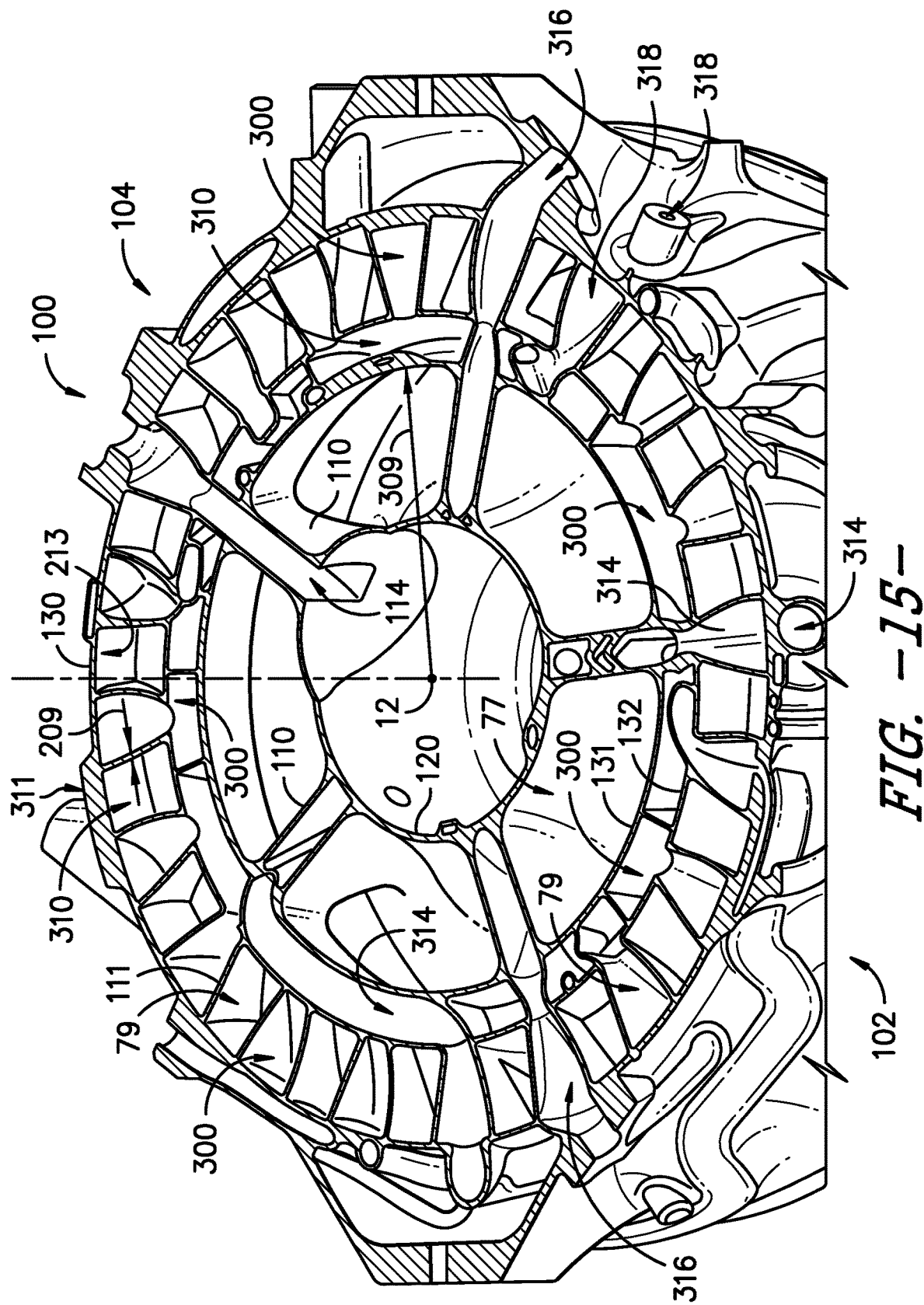

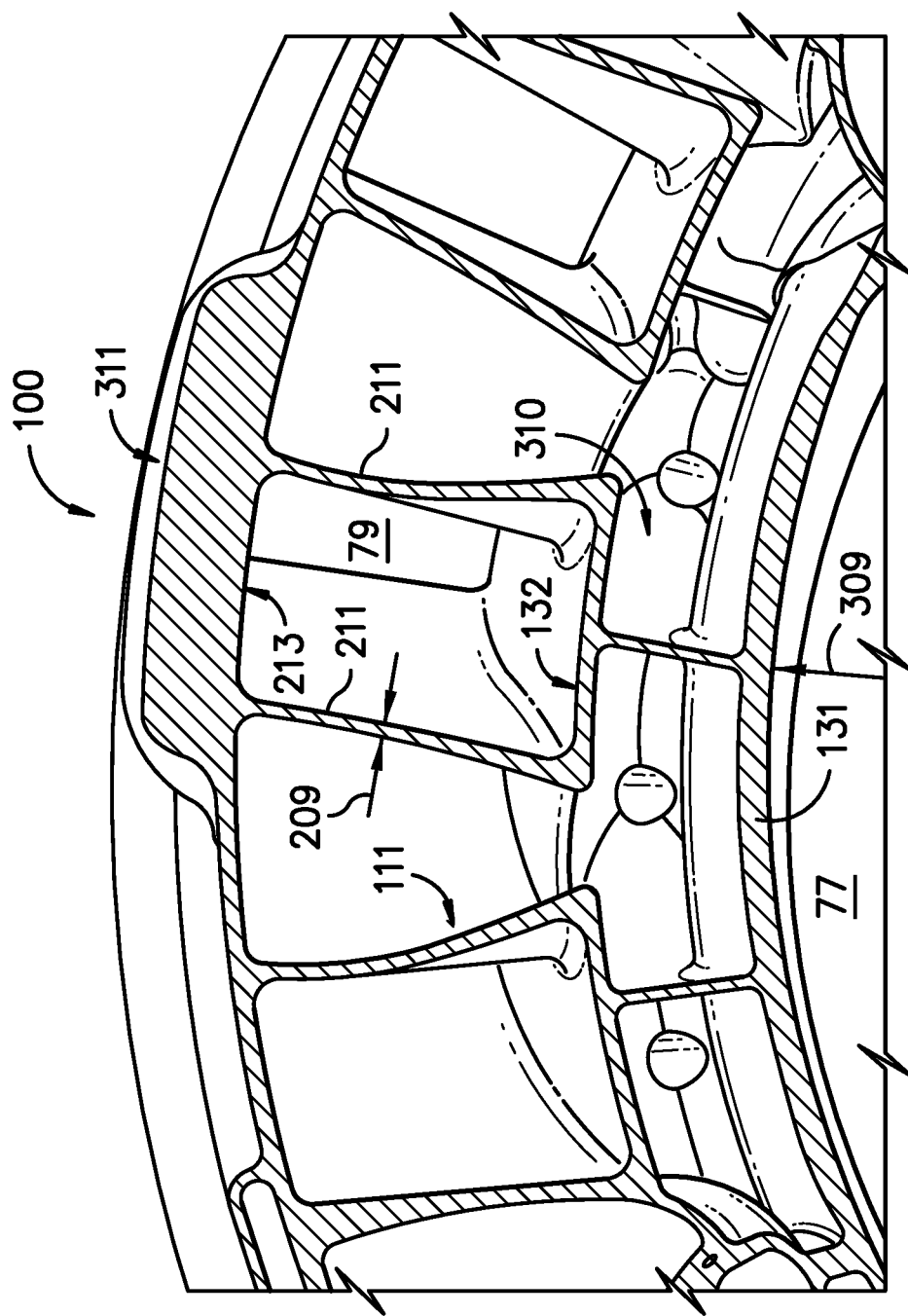
FIG. -16-

FRAME FOR A HEAT ENGINE

FIELD

The present subject matter relates generally to casings or frames for heat engines. The present subject matter relates more particularly to casings or frames including fluid passages. The present subject matter more particularly relates to casings and frames for turbo machines.

BACKGROUND

Precipitation or debris that enters an engine may cause significant damage to internal components, such as if ingested into a flowpath. Anti-icing systems generally attempt to remove or mitigate creation or accumulation of ice, snow, or other debris that may build up at the inlet of an engine.

Known anti-icing systems may insulate a portion of an inlet duct, or provide heat to a portion of an inlet duct. However, known systems may insufficiently heat the inlet duct. Other known systems may provide heat but also distort the geometry of the inlet duct, such that inlet airflow may be distorted as it arrives at a compressor, which may lead to asymmetric airflows and diminished operability or performance of the compressor.

Furthermore, it is generally a requirement to reduce weight while providing for features that may accommodate fluid passages, anti-icing, structural integrity for, mounting, and aerodynamic performance. As such, there is a need for an improved inlet duct. Additionally, there is a need for thermal management systems that can alleviate one or more of issues related to icing, foreign object debris, and mitigating inlet distortion.

BRIEF DESCRIPTION

Aspects and advantages of the invention will be set forth in part in the following description, or may be obvious from the description, or may be learned through practice of the invention.

A frame for a heat engine according to aspects of the present disclosure is provided. The frame includes an inner wall extended from an inlet end to an outlet end, the inner wall forming at least in part a core flowpath, the inner wall comprising a plenum formed between an outer portion of the inner wall and an inner portion of the inner wall, wherein a cavity is formed inward of the inner portion of the inner wall, and wherein the inner wall includes a first plenum opening providing fluid communication between the cavity and the plenum, and wherein the inner wall comprises a second plenum opening providing fluid communication between the plenum and the core flowpath.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross sectional view of an exemplary thermal management system at a heat engine according to an aspect of the present disclosure;

FIG. 2 is a perspective view of a portion of an exemplary embodiment of a gas turbine engine including a thermal management system according to an aspect of the present disclosure;

FIG. 3 is a cross sectional view of a portion of an embodiment of a frame for a heat engine according to an aspect of the present disclosure;

FIG. 4 is a detailed cross sectional view of a portion of an embodiment of a frame for a heat engine according to an aspect of the present disclosure;

FIG. 5 is a perspective view of a portion of an embodiment of a frame for a heat engine according to an aspect of the present disclosure;

FIG. 6 is a sectional view at plane 6-6 of the embodiment of the frame depicted in regard to FIG. 5;

FIG. 7 is a perspective view of an embodiment of a frame for a heat engine according to an aspect of the present disclosure;

FIG. 8 is a partially transparent view of an embodiment of a frame for a heat engine according to an aspect of the present disclosure;

FIG. 9 is a side view of an embodiment of a frame for a heat engine according to an aspect of the present disclosure;

FIG. 10 is a schematic diagram of an embodiment of a thermal management system according to an aspect of the present disclosure;

FIG. 11 is a schematic diagram of another embodiment of a thermal management system according to an aspect of the present disclosure;

FIG. 12 is a partially transparent view of an embodiment of a frame for a heat engine according to an aspect of the present disclosure;

FIG. 13 is a partially transparent view of another embodiment of a frame for a heat engine according to an aspect of the present disclosure;

FIG. 14 is a partially transparent view of a portion of an embodiment of a frame according to an aspect of the present disclosure;

FIG. 15 is a cutaway perspective view at plane 15-15 of an embodiment of the frame of FIG. 3; and FIG. 16 is a flowpath view of a portion of the cutaway view of the embodiment at plane 15-15 of FIG. 15.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, FIG. 1 provides a schematic cross-sectional view of an exemplary thermal management system in accordance with an aspect of the present disclosure. In various embodiments, the thermal management system may be configured as an engine 10. The engine 10 may be configured as a gas turbine engine or turbo machine generally, or a turboprop, turboshaft, turbofan, turbojet, propfan or unducted fan, or other specific turbo machine configuration. In other embodiments, the engine 10 may be configured as a heat engine or Brayton Cycle machine generally, in which a flow of oxidizer is provided an utilized to produce thrust, power, torque, or another desired output. Still further, although the embodiment depicted in regard to FIG. 1 depicts a substantially straight flow through the engine, it should be appreciated that the engine 10 may be configured as a reverse-flow engine in which a flow of oxidizer and/or gases therethrough flow or egress in a direction opposite of an inlet or exit of the engine.

As shown in FIG. 1, the engine 10 defines a longitudinal or axial centerline axis 12 extending through for reference. A radial direction R is extended from the centerline axis 12. The engine 10 may generally include a substantially tubular outer casing 14 formed from a single casing or multiple casings, such as one or more castings, forgings, machined structures, or additively manufactured structures. One or more of the casings 14 may include a frame 100 such as further described herein. In certain embodiments, the frame 100 is positioned at an oxidizer inlet end 102 of the engine 10. It should therefore be appreciated that the inlet end 102 refers to a direction from which oxidizer (e.g., air) flows into a structure (i.e., an upstream end), such as the engine 10 generally, or the frame 100 specifically. In various embodiments depicted herein, the frame 100 defines an inlet frame or casing receiving gases and providing at least a portion of the received air to one or more of a compressor section 21, a combustion section 26, a turbine section 31, or an exhaust section 35 of the engine 10. In certain embodiments, the frame 100 depicted herein defines an inlet frame or casing positioned forward or upstream of the compressor section 21 and configured to receive a flow of ambient air and provide all or part of the flow of air to the compressor section 21, such as further described herein.

The outer casing 14 encloses, in serial flow relationship, the compressor section 21, the combustion section 26, the turbine section 31, and the exhaust section 35. A core flowpath 78 is defined through the engine 10, in which the core flowpath 78 defines a primary pathway through which compressed air is generated, mixed, and combusted/detonated to produce work or torque at the turbine section 31. The compressor section 21 includes an annular array of inlet guide vanes 22, one or more sequential stages of compressor rotors 23 (e.g., including an axial and/or centrifugal compressor) and one or more sequential stages of one or more stages of stationary or variable vanes 24.

The combustion section 26 includes a combustion chamber 27 and one or more fuel nozzles 28 extending into the combustion chamber 27. The fuel nozzles 28 supply liquid and/or gaseous fuel to mix with compressed air entering the combustion chamber 27. Further, the mixture of fuel and compressed air combust or detonate within the combustion chamber 27 to form combustion gases 29. As will be described below in more detail, the combustion gases 29 drive both the compressor section 21 and the turbine section 31.

The turbine section 31 includes one or more turbine rotors 33 drivingly connected to one or more compressor rotors 23. The turbine section 31 includes one or more sequential stages of turbine rotors 33 and one or more sequential stages of stator vanes 32. In certain embodiments, the turbine section 31 includes a power turbine 34 including one or more sequential stages of turbine rotor blades and one or more sequential stages of stator vanes. However, it should be appreciated that in other embodiments, the turbine section 31 may include sequential stages of counter-rotating rotors without stages of stator vanes. As will be discussed below in more detail, one or more of the turbine rotors 33 drives one or more compressor rotors 23 via a driveshaft 36. The power turbine 34 drives a power shaft 37. The power shaft 37 is operably connected to a power output device 38, such as, but not limited to, a propeller assembly, a fan assembly, a rotor assembly (e.g., for rotary wing aircraft), a turbine, an electric load device (e.g., motor and/or generator or other electric machine), a transmission or other gear assembly, or other desired power receiving device.

As shown in the embodiment illustrated in FIG. 1, the compressor section 21 and the turbine section 31 are coupled to one another via the driveshaft 36. During operation, the combustion gases 29 drive the turbine rotor 33 and the power turbine 34. As the turbine rotor 33 rotates around the centerline axis 12, the compressor rotor 23 and the driveshaft 36 both rotate around the centerline axis 12. Further, as the power turbine 34 rotates, the power shaft 37 rotates and transfers rotational energy to the power output device 38.

Referring now to FIG. 2, a perspective view of a portion of an exemplary embodiment of the engine 10 is provided. Referring also to FIG. 3, an axial cross sectional view of a portion of an exemplary embodiment of the engine 10 is provided. The embodiments of the engine 10 provided in regard to FIGS. 2-3 may be configured substantially similarly to one or more embodiments of the engine 10 shown and described in regard to FIG. 1. Referring to FIGS. 2-3, the engine 10 includes the frame 100 positioned forward or upstream of the compressor section 21. In certain embodiments, the frame 100 is an inlet frame or casing. Although depicted as a substantially annular casing or frame 100 extended circumferentially around the axial centerline axis 12, it should be appreciated that other embodiments of the frame 100 are two-dimensional, such as to include a height and width extended perimetrically (i.e., extended along a continuous line forming a boundary of a polygonal figure) from the axial centerline axis 12. In still other embodiments, the frame 100 may include a perimetric cross section (e.g., polygonal cross section, such as rectangular) transitioning to an annular cross section along a direction of flow of fluid through the core flowpath 78.

As further shown and described herein, the frame 100 includes structures, conduits, pathways, or manifolds configured to provide a flow of fluid through and at least partially around the frame 100. As such, in various embodiments, the frame 100 is an anti-icing system configured to receive the flow of fluid for heat transfer to the frame. The structures shown and described herein in regard to the engine 10 including embodiments of the frame 100 may be an integrated, monolithic structure. Embodiments of the frame 100 provided herein may improve efficiency and/or performance of the engine 10, such as by reducing or eliminating a flow of oxidizer re-directed from the compressor section 21 for anti-icing. For example, conventional engines, such as aircraft turbo machines, generally utilize oxidizer flow from a compressor section for anti-icing at an engine structure, such as an inlet structure, nacelle, or other casing upstream of the compressor section.

Embodiments of the engine 10 including embodiments of the frame 100 provided herein include structures, such as flowpaths, passages, conduits, etc. that provide a heated fluid to the frame 100 to reduce, mitigate, or eliminate icing at the inlet end 102 of the engine 10. In certain embodiments described herein, the flow of fluid is a lubricant, hydraulic fluid, or fuel, or combinations thereof, directed to the frame 100. The flow of fluid possesses thermal energy that is transferred to the frame 100, such as to heat the frame and reduce or mitigate icing, thermal distortion, or other conditions that may adversely affect operation of the engine 10. Such adverse conditions that may be mitigated or eliminated include inlet distortion, compressor stall or surge, asymmetric airflows, or foreign object debris (FOD), such as FOD that may be attributable to icing at an inlet casing, or other losses to engine operability. Embodiments of the frame 100 provided herein may further improve engine performance, such as by not requiring a flow of oxidizer (e.g., compressed air) to the frame 100 from the compressor section 21. As such, relatively more oxidizer is available to the combustion section 26 for mixing with fuel and generation of combustion gases in contrast to conventional engines, thereby allowing for improved performance and/or efficiency relative to an amount of fuel, rotational speed, and performance parameter of the engine without embodiments of the frame 100 provided herein.

The frame 100 includes an inlet end 102 and an outlet end 104 between which a portion of the core flowpath 78 at the frame 100 is defined. The core flowpath 78 extends from the inlet end 102 outward along the radial direction R and then inward along the radial direction R toward the outlet end 104. Proximate to the outlet end 104 is a first strut 110 extended radially across a primary flowpath 77 defined at the core flowpath 78 at the frame 100. In certain embodiments, the first strut 110 defines, at least in part, the outlet end 104 of the frame 100 at the core flowpath 78. In still certain embodiments, a second strut 111 is further extended radially through a secondary flowpath 79 radially outward of the core flowpath 78. The second strut 111 defined, at least in part, a second exit end 106 of the frame 100 at the secondary flowpath 79.

In various embodiments, the frame 100 includes a splitter 112 separating the core flowpath 78 to a primary flowpath 77 and the secondary flowpath 79. The struts 110, 111 are positioned at the splitter 112. The primary flowpath 77 is a first portion of the frame 100 extended in fluid communication to a core engine (e.g., all or part of the compressor section 21, the combustion section 26, and the turbine section 31) downstream of the frame 100, such as to the compressor section 21. The secondary flowpath 79 is a second portion of the frame 100 extended generally around the core engine, such as, but not limited to, a bypass flowpath, a third stream flowpath, a bleed system, or other flowpath for the engine 10 or an associated apparatus (e.g., an aircraft, vehicle, or system to which the engine 10 is attached). The first strut 110 is extended radially through the primary flowpath 77 at the outlet end 104. The second strut 111 is further extended radially through the secondary flowpath 79.

In still various embodiments, one or more manifolds or conduits 114 is extended through the struts 110, 111 and the splitter 112. The conduits 114 provide and/or egress one or more fluids to or from the frame 100. Referring to FIG. 3, in one embodiment, the conduit 114 provides fluid communication from radially outward portions of the frame 100 to one or more bearing assemblies 150 radially inward of an inner wall 120 of the frame 100.

Referring still to FIGS. 2-3, the frame 100 includes an inner wall 120 extended from the inlet end 102 to the outlet end 104. The frame 100 further includes an outer wall 130 extended from the inlet end 102 to a second outlet end 106 positioned at the secondary flowpath 79. In certain embodiments, the outer wall 130 is extended from the inlet end 102 to the second strut 111. In still certain embodiments, the inner wall 120 is extended from the inlet end 102 to the first strut 110 and the first outlet end 104.

Referring now to FIG. 4, an exemplary embodiment of a portion of the engine 10 including the frame 100 is provided in further detail. The embodiment depicted in regard to FIG. 4 is configured substantially similarly as shown and described in regard to FIGS. 2-3. In various embodiments, at least a portion of the inner wall 120 includes a double wall structure 122 extended from the inlet end 102. The double wall structure 122 includes an outer portion 123 in direct fluid contact with the core flowpath 78. The double wall structure 122 further includes an inner portion 124 radially inward of the outer portion 123. A plenum 121 is defined between the outer portion 123 and the inner portion 124. In various embodiments further depicted and described herein, the plenum 121 is further sectioned into a plurality of plenums via one or more walls extended between the outer portion 123 and the inner portion 124.

Referring to FIGS. 2-4, radially inward of the inner wall 120 and the inner portion 124 is a cavity 125. In certain embodiments, the cavity 125 is an enclosed space or volume. The cavity 125 is defined at least by the frame 100. In various embodiments, one or more other structures may further define the cavity 125, such as a shaft, shroud, torque tube, or sleeve 200.

The inner portion 124 of the double wall structure 122 of the inner wall 120 includes one or more first plenum openings 126 providing fluid communication between the plenum 121 and the cavity 125. The inner wall 120 further includes one or more second plenum openings 128 providing fluid communication between the plenum 121 and the core flowpath 78. In certain embodiments, the second plenum opening 128 is defined through the outer portion 123 of the double wall structure 122 of the inner wall 120. The first plenum opening 126 and the second plenum opening 128 together allow for a fluid 91, such as an oxidizer, air, or inert gas, to flow from the cavity 125 into the plenum 121 and the core flowpath 78. The flow of fluid therethrough may provide heat transfer to the frame 100, such as to provide anti-icing benefits such as described herein.

In certain embodiments, a plurality of the first plenum openings 126 is defined through the inner portion 124. In some embodiments, the frame 100 includes at least one hundred first plenum openings 126 distributed circumferentially or perimetrically through the inner portion 124 of the double wall structure 122. In other embodiments, the frame 100 includes at least five hundred first plenum openings 126 distributed circumferentially or perimetrically through the inner portion 124 of the double wall structure 122. In particular embodiments, the frame 100 includes at least nine hundred discrete first plenum openings 126 distributed circumferentially or perimetrically through the inner portion 124 of the double wall structure 122. In still particular embodiments, the plurality of first plenum openings 126 is distributed axially along the inner wall 120. As such, the flow of fluid 91 is allowed to enter into the plenum 91 throughout the axial distance of the plenum 91 and the double wall structure 122. For instance, the flow of fluid 91 is permitted to enter the plenum 91 at or proximate to the inlet end 102 of the frame 100. The flow of fluid 91 is further permitted to enter the plenum 91 distal to the inlet end 102, or more proximate to the outlet end 104 of the frame 100. The flow of fluid 91 is further permitted to enter the plenum 91 at a plurality of locations between the inlet end 102 of the frame 100 and the outlet end 104 of the frame 100.

Referring to FIG. 4, in various embodiments, the second plenum opening 128 is positioned at a downstream end of the double wall structure 122 (i.e., the downstream end being downstream relative to the flow of oxidizer 89 into the frame 100 to the core engine 18). Stated differently, in certain embodiments, the second plenum opening 128 is positioned through the outer portion 123 of the double wall structure 122 distal to the inlet end 102. The second plenum opening 128 is extended through the outer portion 123 of the inner wall 120 to permit the flow of fluid 91 through the first plenum opening 126 and through the plenum 121 and egress into the core flowpath 78 through the second plenum opening 128.

In various embodiments, the frame 100 includes a plurality of discrete second plenum openings 128 distributed circumferentially or perimetrically through the inner wall 120. In some embodiments, a quantity of the second plenum openings 128 is equal to or less than a quantity of the first plenum openings 126. In other embodiments, a total cross sectional area or volume of the second plenum openings 128 is equal to or less than a total cross sectional area or volume of the first plenum openings 126. In certain embodiments, positioning the second plenum opening 128 at the downstream end of the outer portion 123 of the double wall structure 122 allows for the flow of fluid 91 to enter the plenum 91 and transfer heat along the axial distance of the double wall structure 122 before egressing into the core flowpath 78 via the second plenum opening 128. In various embodiments, the second plenum opening 128 and the first plenum opening 126 are together configured to provide desirable pressure difference and/or flow through the plenum 121.

Positioning and/or ratios of the quantities of the second plenum opening 128 and the first plenum opening 126 may provide particular benefits related to heat transfer at the frame 100 that may further improve performance of the engine 10. Such benefits include anti-icing at the inner wall 120, such as to prevent accumulation and/or ingestion of ice into the core engine 18. Additionally, placement of the second plenum opening 128 distal to the inlet end 102 may permit desired accumulation of thermal energy in the plenum 121 and heat transfer to the double wall structure 122, such as the outer portion 123 in particular. The plurality of first plenum openings 126 may further provide particular benefits not previously known or provided in anti-icing structures. For instance, the plurality of first plenum openings 126 may provide improved heat transfer at the upstream end proximate to the inlet end 102, where ice may be more prone to form or accumulate. The plurality of first plenum openings 126 may further provide for collection of thermal energy at the inlet end 102 at a forward collector 221 to mitigate formation or build-up of ice at the inlet end 102, such as further described herein. The plurality of second plenum openings 128 may further provide be positioned at an aft collector 222 distal to the inlet end 102 such as to provide a substantially uniform pressure and/or flow of fluid 92 egressed from the second plenum opening 128 into the core flowpath 78, such as further described herein. The substantially uniform pressure and/or flow of fluid 92 into the core flowpath 78 may mitigate or eliminate adverse effects to inlet oxidizer conditions at the compressor section 21 (FIGS. 1-2). For instance, positioning of the second plenum opening 128, the first plenum opening 126, and one or more of the collectors 221, 222 may provide desired heat transfer at the double wall structure 122 to mitigate icing while further mitigating inlet distortion at the frame 100 and/or mitigating formation of distorted airflow conditions into the compressor section 21 (FIGS. 1-2) that would be due to circumferential variations in temperature or pressure of oxidizer egressing the frame 100 and entering the compressor section 21.

In some embodiments, the outer portion 123 of the double wall structure 122 includes an inner surface 223 in the plenum 121. The inner surface 223 includes a turbulator structure 323 (FIG. 6), such as to provide a turbulent boundary layer at the inner surface 223 of the double wall structure 122 within the plenum 121. In various embodiments, the turbulator structure 323 includes a plurality of protuberances, such as, but not limited to, bumps, lumps, knobs, humps, juts, projections, prominences, protrusions, bulges, dimples, spikes, or certain desired surface area roughness. In certain embodiments, the turbulator structure 323 at the inner surface 223 may include at least one thousand protuberances across the circumference or perimeter of the double wall structure 122. In some embodiments, the turbulator structure 323 at the inner surface 223 may include at least five thousand protuberances across the circumference or perimeter of the double wall structure 122. In still certain embodiments, the turbulator structure 323 may include at least ten thousand protuberances.

In various embodiments, the turbulator structure including a plurality of protuberances may improve heat transfer from the flow of fluid through the plenum 121 to the outer portion 123 of the inner wall 120. In certain instances, the ranges of quantity of plurality of protuberances at the inner surface 223 increase the heat transfer coefficient over known structures. In some embodiments, the outer portion 123 of the inner wall 120, such as depicted at 225, is twice as thick or greater as the inner portion 124 of the inner wall 120, such as depicted at 227. In other embodiments, the outer portion 123 of the inner wall 120 is between two-times thicker and three-times thicker than the inner portion 124 of the inner wall 120. In still other embodiments, the outer portion 123 is greater than twice as thick as the inner portion 124 of the inner wall 120.

Various embodiments of the double wall structure 122 provided herein include ranges or quantities that, alone or in combination, may provide benefits not known or previously expected in the art. In one embodiment, a ratio of the quantity of the plurality of protuberances versus the thickness 225 of the outer portion 123 provides particular heat transfer benefits at the frame 100 and the engine 10. In another embodiment, a ratio of the thickness 225 of the outer portion 123 versus the thickness 227 of the inner portion 124 provides particular heat transfer benefits at the frame 100 and the engine 10. In still another embodiment, a ratio of the quantity of the plurality of protuberances versus the thickness 225 of the outer portion 123 and the thickness 227 of the inner portion 124 provides particular heat transfer benefits at the frame 100 and the engine 10. Heat transfer benefits may include desired anti-icing at the inner wall 120, such as receiving and retaining thermal energy at the outer portion 123 and minimizing retained thermal energy at the inner portion 124. Such ratios may desirably improve anti-icing at the inner wall 120 relative to the core flowpath 78. Such ratios may further reduce inefficiencies related to heat retention at portions of the frame 100 that may not desirably affect icing at the core flowpath 78, such as the inner portion 124 at the plenum 121. Additionally, or alternatively, heat transfer benefits may include thermal energy retention at the outer portion 123 of the inner wall 120 while reducing or mitigating heat loss or thermal energy transfer to the flow of oxidizer through the core flowpath 78. As lower oxidizer temperatures upstream of the compressor section 21 generally provide improved engine performance, the frame 100 may provide anti-icing and further reduce efficiency losses at the engine 10 by mitigating increases in inlet air temperature upstream of the compressor section 21.

Referring now to FIG. 5, a cutaway perspective view of an exemplary embodiment of a portion of the frame 100 of the engine 10 is provided. The embodiment depicted in regard to FIG. 5 is configured substantially similarly as shown and described in regard to FIGS. 1-4. Referring also to FIG. 6, a cross sectional view of an exemplary embodiment of a portion of the frame 100 of the engine 10 is provided. The embodiment shown and described in regard to FIG. 6 is configured and operable substantially similarly as shown and described in regard to FIGS. 1-5. Regarding FIGS. 5-6, the frame 100 further includes one or more plenum walls 229 extended between the outer portion 123 and the inner portion 124 of the double wall structure 122 of the inner wall 120. The plenum wall 229 is extended at least partially along an axial distance of the double wall structure 122. The plenum wall 229 sections or divides the plenum 121 into two or more portions divided by the plenum wall 229.

Referring to FIGS. 4-6, the plenum wall 229 may generally include ribs or other features providing structural support at the double wall structure 122. Structural support provided by the double wall structure 122 includes ballistics protection, such as for withstanding foreign object debris (FOD) ingestion (e.g., bird strikes, ice ingestion, or other non-oxidizer matter that may enter the engine 10). Additionally, or alternatively, the plenum wall 229 may further improve heat transfer at the double wall structure 122. In some embodiments, the plenum wall 229 provides convective heat transfer from the flow of fluid 92 at the double wall structure 122. In still some embodiments, the plenum wall 229 additionally or alternatively provides conductive heat transfer from the flow of fluid 92 by forming a plurality of flowpaths within the plenum 121, such as further described herein. Additionally, or alternatively, the plenum wall 229 may form high pressure regions of the plenum 121 relative to one or more of the collectors 221, 222 at opposing ends of the plenum 121. In certain embodiments, the plenum 121 includes a portion 224 (FIG. 5) positioned forward or upstream of the aft collector 222. In other embodiments, the portion 224 of the plenum 121 is positioned aft or downstream of the forward collector 221. In still various embodiments, the portion 224 of the plenum 121 is positioned between the forward collector 221 and the aft collector 222. The portion 224 of the plenum 121 includes a cross sectional area 226 (FIG. 6) less than a cross sectional area 228 (FIG. 4) one or both of the collectors 221, 222. The portion 224 of the plenum 121 may define a low flow region at which the flow of fluid 91 through the plenum 121 is allowed a longer residence time before egressing through the second plenum opening 128. In various embodiments, the portion 224 of the plenum 121 may generally correspond to the two or more portions divided by the plenum wall 229.

Referring back to FIGS. 4-6, the forward collector 221, the aft collector 222, or both may each provide volumes at which pressure and/or flow of fluid in the plenum 121 is normalized or averaged before the flow of fluid 92 egresses into the core flowpath 78. During operation of an exemplary embodiment of the engine 10, the flow of fluid 91 enters the plurality of portions 224 of the plenum 121 each divided by the plenum wall 229. Each portion 224 of the plenum 121 may experience differences in pressure, such as due to circumferential or perimetric differences in temperature based at least on potential icing conditions at the inlet end 102. Additionally, or alternatively, each portion 224 of the plenum 121 may experience differences in pressure based at least on obstruction, clogging, or other covering of the first plenum opening 126, the second plenum opening 128, or both. As such, the forward collector 221 may provide substantially uniform temperature and/or pressure of fluid in the plenum 121. The forward collector 221 may further provide such conditions despite obstruction of a portion of the first plenum openings 126 and/or icing conditions from the flow of fluid 89 at the inlet end 102 of the frame 100. The substantially uniform temperature and/or pressure at the forward collector 221 may allow for substantially the entire circumference or perimeter of the inner wall 120 at the inlet end 102 to receive thermal energy from the flow of fluid 91 and transfer thermal energy to the inner wall 120 at least at the inlet end 102.

Additionally, or alternatively, the aft collector 222 may provide substantially uniform temperature and/or pressure to the flow of fluid 92 egressing the second plenum opening 128. The substantially uniform temperature and/or pressure of the flow of fluid 92 provided at least by the aft collector 222 may allow for substantially uniform flow conditions of the flow of oxidizer 89 at the core flowpath 78. During operation of an exemplary embodiment of the engine 10, the aft collector 222 may mitigate formation of asymmetric or distorted flow conditions of the flow of oxidizer 89 at the core flowpath 78 at or downstream of the second plenum openings 128. As such, the flow of oxidizer 89 may receive the flow of fluid 92 from the second plenum opening 128 without producing undesired turbulence, distortion, wakes, vortices, or other fluid dynamics at or downstream of the second plenum opening 128.

Furthermore, or alternatively, the compressor section 21 may receive a substantially uniform flow of oxidizer 89 from the frame 100. It should be appreciated that compressor sections are often challenged to operate under inlet distortion conditions (e.g., circumferential flow asymmetries due to physical or aerodynamic distortions or variations in flow). As such, the frame 100 may mitigate ice formation at the frame 100, and further mitigate other asymmetries or distortions in the flow of oxidizer in the core flowpath 78 that may have an adverse or undesired effect on performance or operability of the compressor section 21.

Referring now to FIGS. 7-8, perspective views of embodiments of the frame 100 are provided. Referring further to FIG. 9, a side view of another embodiment of the frame 100 is provided. The embodiments depicted in regard to FIGS. 7-9 may each be configured substantially according to one or more embodiments shown and described in regard to the engine 10 and frame 100 in FIGS. 1-6. Referring more particularly to FIGS. 2-4 and FIGS. 7-9, in various embodiments, the frame 100 includes a passage 230 formed in the outer wall 130. The passage 230 is extended at least partially circumferentially around the core flowpath 78 through the outer wall 130, such as depicted in FIGS. 7-8. In certain embodiments, the passage 230 is extended substantially circumferentially around the core flowpath 78 through the outer wall 130.

Referring to FIGS. 7-8, the passage 230 includes one or more windings 231 of the passage 230 extended at least partially circumferentially through the outer wall 130. The passage 230 may further include one or more turns 233 at which a flow of fluid, depicted via arrows 86, changes from a first direction to a second direction. In one embodiment, the windings 231 are substantially along a circumferential direction C relative to the axial centerline axis 12. The turn 233 extends at least partially along the longitudinal direction L and along the circumferential direction C to direct the flow of fluid 86 from the first direction along the circumferential direction to the second direction opposite of the first direction (e.g., from clockwise to counter-clockwise, or from counter-clockwise to clockwise).

The frame 100 further includes an inlet port 236 and an outlet port 237. The flow of fluid 86(a) is received at the frame 100 to the passage 230 at the outer wall 130 through the inlet port 236. The flow of fluid 86 generally includes thermal energy that is transferred from the fluid 86 in the passage 230 to the outer wall 130 of the frame 100. The passage 230 may therefore provide anti-icing at the outer wall 130. The frame 100 may further be configured to receive the flow of fluid 86(a) as a first flow of heated fluid at the outer wall 130 different from the flow of fluid 90, 91, 92 as a second flow of heated fluid at the inner wall 120, such as further described herein. As such, the frame 100 may be configured to promote anti-icing and/or mitigate distortion at two or more walls forming the core flowpath 78.

Referring still to FIGS. 7-8, the passage 230 may be configured to receive the flow of fluid 86(a) through the inlet port 236 and immediately direct the flow of fluid 86 to the inlet end 102 of the frame 100. The passage 230 may therefore form a first winding 232 at the inlet end 102, such as to provide a greater portion of thermal energy to portions of the frame 100 that may be more prone to icing (e.g., the inlet end 102). The passage 230 may further form a second winding 234 distal to the inlet end 102. The passage 230 may still further form one or more third windings 238 longitudinally between the first winding 232 and the second winding 234. As such, it should be appreciated that the frame 100 may form one or more windings 231 of the passage 230 that provide for the passage 230 to extend substantially circumferentially around the core flowpath 78 and at least partially along the longitudinal direction L. It should further be appreciated that the windings 231 of the passage 230 may generally be configured to position the first winding 232 proximal to the inlet end 102 such as to receive and transfer a greater portion of thermal energy from the flow of fluid 86 to the outer wall 130. Furthermore, the windings 231 of the passage 230 may generally be configured to position the second winding 234 distal to the inlet end 102 (e.g., more proximate to the outlet end 103 than the first winding 232) such as to receive and transfer a lesser portion of thermal energy from the flow of fluid 86 to the outer wall 130. The winding 231 of the passage 230 may further be configured generally to position the third winding 238 longitudinally between the first winding 232 and the second winding 234.

The positioning of the passage 230, such as the first winding 232, the second winding 234, the third winding 238, the inlet port 236, and/or the outlet port 237, may provide certain benefits not previously known for inlet ducts. In certain embodiments, the windings 231 of the passage 230 are configured to provide a greater desired portion of heat to the outer wall 130 at the inlet end 102 such as to mitigate or eliminate formation of icing at the frame 100. Mitigating or eliminating formation of ice at the frame 100 may mitigate or eliminate risks associated with undesired FOD ingestion into the engine 10. Furthermore, or alternatively, the windings 231 of the passage 230 shown and described herein may mitigate or eliminate thermal distortion of the frame 100. Embodiments shown and depicted herein may particularly mitigate circumferential distortions and/or reduce a thermal gradient along the circumference or perimeter of the outer wall 130. Mitigating or eliminating thermal distortion may improve operability of the engine 10, or mitigate reduction in operability at certain conditions (e.g., at icing conditions, or high thermal gradients generally) by providing substantially uniform geometry of the frame 100 for the flow of oxidizer 89 therethrough to the core engine 18 (e.g., the compressor section 21). Mitigating or eliminating thermal distortion, or generally reducing the thermal gradient, may further reduce stresses that may be applied to one or more structure attached directly or indirectly to the frame 100, such as, but not limited to, the compressor section 21, the bearing assembly 150, or one or more rotors or shafts that may extend through the frame 100.

Still further, positioning of the passage 230 such as shown and described herein, in addition to embodiments of the double wall structure 122 at the inner wall 120, may together mitigate or eliminate thermal distortion at the frame 100. In certain embodiments, the passage 230 at the outer wall 130 and the double wall structure 122 at the inner wall 120 may together mitigate or eliminate formation of thermal distortion, icing, or other undesired thermal conditions or distortions at the frame 100 by reducing geometric changes relative to an inner flowpath or inner annular structure versus an outer flowpath or outer annular structure.

It should be appreciated that in other embodiments (not depicted) the passage 230 may extend substantially along the longitudinal direction L such that the turns 233 change the flow of fluid 86 within the passage 230 from a first direction along the longitudinal direction to a second direction opposite of the first direction.

Various embodiments of the frame 100 provided herein may allow for the core flowpath 78 to extended perimetrically or annularly between the outer wall 130 the inner wall 120. In certain embodiments, the frame 100 is allowed to be free of structures, such as vanes, struts, or structural supports, positioned in the core flowpath 78 between the inner wall 120 and the outer wall 130. In still certain embodiments, the frame 100 is allowed to be free of structures positioned in the core flowpath 78 between the outer wall 130 and the double wall structure 122 of the inner wall 120. In one embodiment, the frame 100 is free of structures positioned in the core flowpath 78 between the outer wall 130 and the outer portion 123 of the inner wall 120.

Full perimetric or annular extension of the core flowpath 78 between the outer wall 130 and the inner wall 120 may decrease weight, such as by removing structures unnecessary for flow conditioning for the downstream structures (e.g., the compressor section 21, the combustion section 26, or the turbine section 31). Additionally, or alternatively, full perimetric or annular extension of the core flowpath 78 between the outer wall 130 and the inner wall 120 may mitigate thermal distortion of the frame 100 at least at the inlet end 102, such as by de-coupling the outer wall 130 from the inner wall 120 at the inlet end 102, or by de-coupling the outer wall 130 from the inner wall 120 between the inlet end 102 and the downstream end of the double wall structure 122 at the inner wall 120 and/or the passage 230 at the outer wall 130.

Referring now to FIGS. 10-11, schematic diagrams are provided of the engine 10 including various embodiments of the frame 100 shown and described in regard to FIGS. 1-9. The engine 10 and frame 100 in FIGS. 10-11 are each configured substantially as shown and described in regard to one or more embodiments in regard to FIGS. 1-9. The engine 10 may further include a fluid system 160 configured to provide and receive pressurized flows of fluid, such as, lubrication (e.g., oil or oil-based fluids), fuel (e.g., liquid and/or gaseous hydrocarbon fuels), or hydraulic fluid. Referring to FIGS. 10-11, in conjunction with FIGS. 1-9, the fluid system 160 provides a flow of fluid, such as a first fluid depicted schematically via arrows 86, to the passage 230 at the frame 100. The flow of fluid 86 defining a first fluid, such as a lubricant, a fuel, or a hydraulic fluid, is different from the flow of fluid 90, 91, 92 defining a second fluid, such as oxidizer generally, or compressed air, provided to the outer wall 130. Referring to FIGS. 10-11, and in conjunction with embodiments depicted in regard to FIGS. 8-9, the flow of fluid 86 enters the passage 230 at the frame 100 via an inlet port 236, such as shown schematically via arrows 86(*a*). The flow of fluid 86 egresses the passage 230 at the frame 100 via an outlet port 237, such as shown schematically via arrows 86(*b*).

In certain embodiments, such as depicted in regard to FIG. 9, the frame 100 further includes a second flow passage 235 at the outer wall 130 in thermal communication with the outer wall 130 before providing the flow of fluid 87 back to the fluid system 160, such as further described and depicted in regard to FIG. 9. The second flow passage 235 may generally define a scavenge conduit through which fluid is egressed from the frame 100 and returned to the fluid system 160 (FIGS. 10-11). In certain embodiments, such as depicted in regard to FIGS. 10-11, the second flow passage 235 is extended in fluid communication from the bearing assembly 150 to egress fluid to the fluid system 160. The second flow passage 235 is extended at least partially circumferentially at the outer wall 130 to provide thermal communication of the flow of fluid 87 within the second flow passage 235 with the outer wall 130 and/or the flow of oxidizer 89 through the core flowpath 78.

Referring back to FIGS. 10-11, certain embodiments of the engine 10 include the serial flow of a first fluid 86 from the fluid system 160 to the frame 100. The first flow of fluid 86, depicted via arrows 86(*a*), is received at the passage 230 via the inlet port 236 (FIGS. 8-9) and egressed through the outlet port 237 (FIGS. 8-9), such as depicted via arrows 86(*b*). The egressed flow of fluid 86(*b*) is provided to the bearing assembly 150, such as through one or more conduits 114 extended through one or more struts 110 (FIG. 3). In various embodiments, the flow of fluid, depicted schematically via arrows 87, is scavenged, removed, or otherwise egresses the bearing assembly 150. In certain embodiments, such as depicted in regard to FIG. 9, the egressed flow of fluid 87 will have received thermal energy from the bearing assembly 150, such as by acting as a heat sink receiving thermal energy from rotation of the rotors and bearings. The heated flow of fluid 87 is then provided in thermal communication to the outer wall 130 at the second flow passage 235, such as further described below. The flow of fluid 87 may then egress back to the fluid system 160. However, it should be appreciated that in other embodiments in which the second flow passage 235 is not provided, the flow of fluid 86 may egress from the bearing assembly 150 back to the fluid system 160 without further thermal communication at the outer wall 130 of the frame 100.

Referring back to FIG. 9, in certain embodiments, the second flow passage 235 is positioned aft or downstream (i.e., downstream relative to the flow of oxidizer through the core flowpath 78) of the passage 230. In such embodiments, the passage 230 positioned at the inlet end 102 and extended at least partially circumferentially and wrapped or turned along the longitudinal direction L (e.g., turns 233) provides a first thermal input from the fluid in the passage 230 in thermal communication with the outer wall 130 and/or the flow of oxidizer through the core flowpath 78. As thermal energy is transferred from the fluid in the passage 230 to the outer wall 130, the thermal energy output decreases from the inlet port 236 to the outlet port 237. Correspondingly, decreasing magnitudes of thermal energy are received at the outer wall 130 along the longitudinal direction L from the inlet end 102 to the outlet end 104. Embodiments of the frame 100 including the second flow passage 235 may receive increased magnitudes of thermal energy extracted from the bearing assembly 150 (FIG. 3) and transfer the thermal energy to portions of the outer wall 130 substantially aft of the passage 230 (e.g., aft of the bends, winds, or turns 233 of the passage 230).

Referring to FIGS. 1-11, during operation of the engine 10, a flow of fluid, depicted schematically via arrows 89, is admitted through the inlet end 102 of the frame 100. Generally, as the flow of fluid 89 is compressed and increases temperature, a portion is utilized as a heating fluid at the frame 100. A flow of fluid, schematically depicted by arrows 90, is provided to the cavity 125 at the frame 100. In certain embodiments, such as depicted schematically in regard to FIG. 10, the flow of fluid 90 is oxidizer from the compressor section 21. In still particular embodiments, the flow of fluid 90 is compressed air routed from one or more stages of the compressor section 21, or from downstream of one or more of a low pressure compressor or a high pressure compressor. For example, the flow of fluid 90 may be compressed air from between a low pressure compressor and a high pressure compressor (i.e., Station 2.5) of the engine 10. As another example, the flow of fluid 90 may be compressed air from or between one or more stages at the compressor section 21.

In other embodiments, the flow of fluid 90 may be from other pressurized oxidizer or inert gas sources that may provide thermal energy to the inner wall 120 of the frame 100. In certain embodiments, such as depicted in regard to FIG. 11, the flow of fluid 90 is provided from the bearing assembly 150 (FIG. 3). In particular embodiments, the flow of fluid 90 is provided from a buffer fluid source, damper fluid source, or scavenged therefrom, and routed to the cavity 125.

It should further be appreciated that the flow of fluid 90 is a heated fluid. In certain embodiments in which the flow of fluid 90 is extracted from the compressor section 21, the increased temperature of the pressurized flow of oxidizer provides the thermal energy that is utilized at the inner wall 120. In other embodiments in which the flow of fluid 90 is extracted from the bearing assembly 150, the increased temperature from thermal attenuation, cooling, or other thermal control at the bearing assembly 150, thermal energy is provided to the inner wall 120 from the flow of fluid 90 that was utilized as a thermal sink at the bearing assembly 150. As provided in regard to FIGS. 1-11, thermal energy from at least a portion of the flow of fluid 90 is then provided to the inner wall 120, such as depicted and described in regard to the flow of fluid 91, 92 through the inner wall 120. The fluid 92 egresses the inner wall 120 and is mixed with the flow of fluid 89 from the inlet end 102 of the core flowpath 78. The flows are mixed, such as depicted via arrows 93, a portion of which may then be utilized as heating fluid at the frame 100 such as described herein.

As such, the first flow of fluid 86, 87 at the outer wall 130 and the second flow of fluid 91, 92 at the inner wall 120 such as in regard to embodiments of the engine 10 and frame 100 shown and described herein may provide inlet anti-icing, mitigate structural distortion upstream of the compressor section 21 or turbine section 31, improve aerodynamics, compressor performance, and/or compressor operability (e.g., via mitigated structural distortion at the inlet), and improve overall engine efficiency via improved usage of heated fluid at the engine 10.

Referring now to FIG. 12, a perspective view depicting an exemplary internal flowpath structure 300 of an embodiment of the frame 100 is generally provided. The embodiment depicted in FIG. 12 is viewed from the inlet end 102 toward the outlet end 104. Referring also to FIG. 13, a perspective view depicting an exemplary internal flowpath structure 300 of another embodiment of the frame 100 is generally provided. The embodiment depicted in FIG. 13 is viewed from the outlet end 104 toward the inlet end 102. It should be appreciated that the embodiments of the frame 100 depicted and described in regard to FIGS. 12-13 may be configured substantially similarly as one or more embodiments shown and described in regard to FIGS. 1-11. It should further be appreciated that certain features or details shown and described in regard to one or more embodiments of the frame 100 are omitted in FIGS. 12-13 for the sake of clarity. Furthermore, as further described below, it will be appreciated that all or part of the flowpath structure 300 may derive benefits based at least in part on novel or advantageous positioning of one or more of the passages 230, 235 shown and described in regard to FIGS. 1-11.

FIG. 14 provides a detailed view of an embodiment of a nozzle portion 303 of the flowpath structure 300. Referring back to FIG. 3, the flowpath structure 300 is positioned at least partially in or through the inner wall 120 of the frame 100. As will be further depicted and described in regard to FIGS. 12-14, in still further embodiments, the flowpath structure 300 is defined at least partially through one or more struts 110. The flowpath structure 300 is configured to provide a flow of fluid to one or more structures aft or downstream (i.e., downstream relative to the flow of oxidizer through the core flowpath 78) of the frame 100. In some embodiments, the flow of fluid is provided to the inlet guide vanes 22 and/or the compressor rotor 23 at the compressor section 21 aft or downstream of the frame 100. In certain embodiments, the flowpath structure 300 is configured to provide a third flow of fluid to the aft or downstream structures, in which the third flow of fluid is different from the first flow of fluid at the outer wall 130 and the second flow of fluid at the inner wall 120. In one embodiment, the third flow of fluid egressed from the flowpath structure 300 is a cleaning solution, water or a water-based solution, or other fluid for cleaning one or more structures aft or downstream of the frame 100. In another embodiment, the third flow of fluid is a cooling fluid for the flow of fluid 89, 93 at the primary flowpath 77. In such an embodiment, the third flow of fluid egresses into the core flowpath 78 from the flowpath structure 300 via an exit opening 305 such as to cool the flow of oxidizer entering the compressor section 21. The lowered temperature of oxidizer entering the compressor section 21 may improve compressor performance or mitigate losses associated with increasing the temperature of the flow of fluid 89 when mixed with the flow of fluid 92 to produce the mixed flow of fluid 93.

Referring still to FIG. 3, and in conjunction with FIGS. 12-14, a curved or radial portion 320 of the inner wall 120 of the frame 100 defines an exit opening 305 of the flowpath structure 300. The exit opening 305 provides fluid communication from the flowpath structure 300 to the core flowpath 78. The frame 100 defines at the outlet end 104 of the core flowpath 78 (i.e., at the outlet end 104 of the primary flowpath 77) a radial span 307 (FIG. 3). In various embodiments, the radial span 307 defines a dimension extended from the axial centerline axis 12 of the primary flowpath 77. In certain embodiments, the exit opening 305 of the flowpath structure 300 is positioned within the radial span 307 and forward or upstream of the outlet end 104 of the frame 100. In one embodiment, the exit opening 305 is positioned at the inner wall 120 such that a direct line-of-sight along the longitudinal direction L is provided relative to one or more structures aft or downstream of the outlet end 104 of the frame 100.

Referring to FIGS. 1-14, the flowpath structure 300 and the exit opening 305 may provide an improved fluid supply system, such as a cleaning system, allowed at least in part by positioning the exit opening 305 within the radial span 307 between a first wall 131 and the inner wall 120, in contrast to known structures that may attempt to provide a cleaning fluid from outside of a radial span of a downstream structure. In some embodiments, providing the flowpath structure 300 at the inner wall 120 allows for the outer wall 130 to have space to receive the flow of fluid 86 to provide benefits described in regard to the outer wall 130.

Referring briefly to FIG. 14, certain embodiments of the nozzle portion 303 of the flowpath structure 300 further include a swirler or vane structure 304 configured to provide a swirled or solid conical flow of fluid toward one or more aft or downstream structures. The flowpath structure 300 may include a plurality of nozzle portions 303 positioned circumferentially and symmetrically or asymmetrically around the core flowpath 78. One or more of the plurality of nozzle portions 303 may be configured differently, such as to collectively provide the flow of fluid across the circumference of the core flowpath 78.

Referring now to FIG. 15, a cutaway perspective view of a portion of an exemplary embodiment of the frame 100 is provided. The cutaway perspective embodiment is provided viewed from the outlet end 104 toward the inlet end 102. Referring also to FIG. 16, a cutaway flowpath view of a portion of the exemplary embodiment of the frame 100 in FIG. 15 is generally provided. The embodiments of the frame 100 depicted in regard to FIGS. 15-16 are configured substantially similarly as shown and described in regard to FIGS. 1-14. It should therefore be appreciated that certain features or reference numbers may be omitted for the sake of clarity.

Referring to FIGS. 15-16, and further in conjunction with FIG. 3, the frame 100 further includes a plurality of hollow cores 310. In some embodiments, the core is positioned between walls, such as radially extended walls 211, of the second strut 111. In further embodiments, the core 310 is positioned between a first wall 131 and a second wall 132 extended from the splitter 112. In certain embodiments, cores 310 are positioned radially outward of the outlet end 104. In still certain embodiments, core 310 are positioned axially aft or downstream of the splitter 112. As such, in various embodiments, the cores 310 are formed between walls 211 of the second strut 111, the first wall 131 defining an outer radius 309 of the primary flowpath 77, and the outer wall 130 at the second strut 111, such as a portion 213 of the outer wall 130 longitudinally at the second strut 111 depicted in FIGS. 3 and 16.

In some embodiments, quantities of the pluralities of the cores 310 are fluidly separated from one another. In certain embodiments, the plurality of cores 310 includes a fluid supply conduit 114 such as to provide the first flow of fluid 86 (e.g., lubricant) to the bearing assembly 150 (FIG. 3). In another embodiment, the plurality of hollow cores 310 includes a scavenge core 318 through which the first flow of fluid 87 (e.g., lubricant) is removed or egressed from the bearing assembly 150. In certain embodiments, the scavenge core 318 is in fluid communication with the second flow passage 235 such as to provide the egressed flow of fluid 87 from the bearing assembly 150 to the second flow passage 235. In still certain embodiments, the plurality of hollow cores 310 includes a thermal management core 314 through which a flow of cooling fluid, such as a fourth flow of fluid, is provided for thermal management or thermal attenuation of the frame 100. In various embodiments, the fourth flow of fluid is different or separate from the first, second, or third flows of fluid. In still certain embodiments, the plurality of cores 310 includes a services passage 316 through which electrical components, cables, connections, manifolds, tubes, wires, sensors, measurement devices, or other electrical or electronic components may be routed through the frame 100, such as to the bearing assembly 150. In still further embodiments, the plurality of cores 310 may include at least a portion of the flowpath structure 300, such as shown and described in regard to FIGS. 12-14.

It should be appreciated that the plurality of cores 310, such as passages 300, 314, 316, 318, are fluidly separated from one another. As such, the services passage 316 may define a substantially dry passage. The flowpath structure 300 may define a passage to provide a fluid wash (e.g., water or water-based solution, or other appropriate cleaning solution) through the exit opening 305 toward the aft or downstream structure (e.g., the inlet guide vanes 22, the compressor rotor 23, etc.). The thermal management core 314 may define a passage to provide a thermal management fluid at the frame 100 different from the first flow of fluid 86 at the outer wall 130 and/or the second flow of fluid 90, 91, 92 at the inner wall 120. The thermal management core 314 may define an air-cooled oil cooler (ACOC), such as cooled by the air through the core flowpath 78 and/or surrounding the frame 100. The scavenge core 318 may define a passage to remove or egress fluid from the bearing assembly 150. Still other passages may define dead spaces such as to remove weight from the frame 100.

In certain embodiments, the plurality of cores 310 includes at least four fluidly segregated passages, such as described above. In some embodiments, the fluidly segregated passages such as described above may include pluralities of passages, such as two or more scavenge passages, two or more supply passages, two or more services passages, or two or more thermal management passages. The passages may generally correspond to a bearing assembly, such as a supply or scavenge passage for a forward bearing assembly different from a supply or scavenge passage for an aft bearing assembly. As such, in various embodiments, the plurality of cores 310 may include at least eleven fluidly segregated passages. In still another embodiment, the plurality of cores 310 may include sixteen or fewer fluidly separated passages.

Furthermore, the plurality of fluidly segregated cores 310 are defined between an outer surface 311 of the outer wall 130 and the outer radius 309 of the primary flowpath 77. In certain embodiments, the walls 211 of the second strut 111 at least partially defining the cores 310 includes a thickness 209 that provides benefits not previously known or expected for frames. Benefits include, but are not limited to, desired heat transfer properties, desired flow rate and pressure loss properties, and sizing relative to a maximum radius at the outer surface 311 of the outer wall 130 and the outer radius 309 of the primary flowpath 77 to the core engine 18.

Referring back to FIG. 1, embodiments of the engine 10 provided herein may include a controller 500 configured to control one or more flows of fluid through one or more passages shown and described herein in regard to FIGS. 1-16. The controller 500 included with the engine 10 can correspond to any suitable processor-based device, including one or more computing devices. The controller 500 can include a processor 512 and associated memory 514 configured to perform a variety of computer-implemented functions. In various embodiments, the controller 500 may be configured to perform steps of a method for anti-icing, thermal management, or distortion mitigation, at an inlet frame at an engine, such as embodiments of the frame 100 provided herein. The steps may include flowing a first flow of fluid at an outer wall; flowing a second flow of fluid at an inner wall, in which the second flow of fluid is different from the first flow of fluid; and adjusting a flow rate of the first flow of fluid and/or the second flow of fluid based at least on a desired temperature at the frame.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 500 may define one or more of a full authority digital engine controller (FADEC), a propeller control unit (PCU), an engine control unit (ECU), or an electronic engine control (EEC).

As shown, the controller 500 may include control logic 516 stored in memory 514. The control logic 516 may include instructions that when executed by the one or more processors 512 cause the one or more processors 512 to perform operations, such as one or more steps or functions, flows or flow rates, or desired temperatures described herein.

Additionally, the controller 500 may also include a communications interface module 510. In various embodiments, the communications interface module 510 can include associated electronic circuitry that is used to send and receive data. As such, the communications interface module 510 of the controller 500 can be used to receive data from the frame 100, the bearing assembly 150, the fluid system 160, a valve 240 positioned between the fluid system 160 and the outer wall 130 to control fluid flow or pressure to or from the outer wall 130, or other valves, sensors, manifolds, or fluid flow, pressure, or temperature control devices as may be incorporated into the present disclosure. The communications interface module 510 can also be used to communicate with any other suitable components of the engine 10, including any number of sensors configured to monitor one or more operating parameters of the engine 10. It should be appreciated that the communications interface module 510 can be any combination of suitable wired and/or wireless communications interfaces and, thus, can be communicatively coupled to one or more components of the engine 10 via a wired and/or wireless connection.

Various embodiments of the frame 100 shown and described herein may be fabricated via one or more manufacturing methods known in the art, such as, but not limited to, additive manufacturing, binder jetting, or 3D printing processes generally, machining processes, material addition or removal processes, or joining or bonding processes. Manufacturing processes may include, but are not limited to, casting, welding, brazing, soldering, or bonding processes. Materials may include those suitable for piston assemblies and pressure vessels configured to receive thermal differentials and operate for desired cycles and power outputs, including rigid and flexible wall members, enclosures, and conduits. Although certain exemplary embodiments may preferably be produced via one or more additive manufacturing processes, it should be appreciated that other manufacturing processes, or combinations thereof, may be utilized. Still further, although certain elements or structures may be produced as substantially monolithic structures, certain elements may be attached or otherwise coupled via welding, brazing, or mechanical fasteners, such as, but not limited to, clamps, nuts, bolts, screws, tie rods, washers, etc.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

In addition, the additive manufacturing process disclosed herein allows a single component (e.g., the frame 100) to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together forms the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process. In certain embodiments, the walls 211 at the cores 310 are at least 1000 μm, or between approximately 1000 μm and approximately 2000 μm, or between approximately 1200 μm and approximately 1900 μm. It should be appreciated that particular ranges of thickness 209 (FIG. 16) at the walls 211 such as provided herein may provide particular benefits to the frame 100, such as desired heat transfer to one or more fluids through the cores 310 and desired or mitigated pressure loss through the cores 310, such as to provide desired fluid flowrate and pressure through the cores 310 and desired heat transfer to and from the fluids within the frame 100. Still further, it should be appreciated that various particular ranges of thickness 209 of the walls 211 provide particular benefits for allowing desired heat transfer and flow through the cores 310 while constrained between the outer radius 309 of the primary flowpath 77 and the radius of the outer surface 311 of the outer wall 130. As such, embodiments of the frame 100 including ranges of wall thickness provided herein may particularly provide desired heat transfer and flow characteristics for turboshaft or turboprop engines sized to produce up to approximately 4500 horsepower. Such engine sizing may particularly be in regard to the outer radius 309 of the primary flowpath 77 at the frame 100 aft of the splitter 112, and further in regard to a maximum radius of the outer surface 311 of the outer wall 130 of the frame 100. The ranges provided herein may further provide improved heat transfer, fluid flow characteristics, and decreased engine weight, together improving efficiency and performance of the engine 10 including the frame 100.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the frame 100 provided herein without undue experimentation. For example, build features, such as trusses, grids, build surfaces, or other supporting features, or material or fluid ingress or egress ports, may be added or modified from the present geometries to facilitate manufacture of embodiments of the frame 100 based at least on a desired manufacturing process or a desired particular additive manufacturing process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While certain embodiments of the present disclosure may not be limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Also, the additive manufacturing methods described above provide much more complex and intricate shapes and contours of the components described herein to be formed with a very high level of precision. For example, such components may include thin additively manufactured layers, cross sectional features, and component contours. As another example, additive manufacturing may provide heat exchanger surface areas, volumes, passages, conduits, or other features that may desirably improve heat exchanger efficiency or performance, or overall engine or system performance. In addition, the additive manufacturing process provides the manufacture of a single component having different materials such that different portions of the component may exhibit different performance characteristics. The successive, additive steps of the manufacturing process provide the construction of these novel features. As a result, the components described herein may exhibit improved functionality and reliability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A thermal management system for a heat engine, the system including an inner wall extended from an inlet end to an outlet end. The inner wall forms at least in part a core flowpath and a cavity. The core flowpath and the cavity are separated by a double wall structure at the inner wall. The double wall structure forms a plenum, a first opening providing fluid communication between the cavity and the plenum, and a second opening providing fluid communication between the plenum and the core flowpath. The inner wall is configured to receive a first flow of fluid. An outer wall is extended from the inlet end toward the outlet end. The outer wall forms a passage extended at least partially around the core flowpath. The outer wall at least partially forms the core flowpath. The outer wall is configured to receive a second flow of fluid fluidly separated from the core flowpath.

2. The system of any clause herein, the system including a fluid system configured to provide the second flow of fluid to the passage at the outer wall.

3. The system of any clause herein, wherein the second flow of fluid is a lubricant, a fuel, a hydraulic fluid, or combinations thereof.

4. The system of any clause herein, wherein the first flow of fluid is an oxidizer.

5. The system of any clause herein, wherein the passage includes one or more windings of the passage extended at least partially circumferentially through the outer wall.

6. The system of any clause herein, wherein the passage includes one or more turns at which the first flow of fluid changes from a first direction to a second direction opposite of the first direction.

7. The system of any clause herein, wherein the passage includes a first winding positioned at the inlet end.

8. The system of any clause herein, wherein the passage includes a second winding positioned longitudinally aft of the first winding, wherein the first winding is configured to provide a greater portion of thermal energy from the first flow of fluid at the inlet end than the second winding aft of the first winding.

9. The system of any clause herein, wherein the passage includes a third winding positioned longitudinally between the first winding and the second winding, wherein the second winding is positioned distal to the inlet end.

10. The system of any clause herein, wherein the passage is in fluid communication with a bearing assembly, the passage configured to provide the second flow of fluid to the bearing assembly.

11. The system of any clause herein, wherein the outer wall defines a second flow passage extended at least partially around the core flowpath.

12. The system of any clause herein, wherein the second flow passage is in fluid communication with the bearing assembly, and wherein the second flow passage is configured to receive the second flow of fluid from the bearing assembly.

13. The system of any clause herein, wherein the second flow passage is positioned aft of the passage along the longitudinal direction.

14. The system of any clause herein, the outer wall forming an inlet port and an outlet port each in fluid communication with the passage, wherein the inlet port is configured to receive the second flow of fluid into the passage, and wherein the outlet port is configured to egress the second flow of fluid to the bearing assembly.

15. The system of any clause herein, wherein the outer wall is radially spaced apart from the inner wall, and wherein the plenum at the inner wall extends from the inlet end toward the outlet end, and wherein the passage at the outer wall extends from the inlet end toward the outlet end.

16. The system of any clause herein, wherein the core flowpath is extended annularly or perimetrically between the outer wall and the inner wall.

17. A turbo machine, the turbo machine defining an inlet end and an outlet end and a core flowpath. The turbo machine including a compressor section configured to generate a first flow of fluid, a fluid system configured to generate a second flow of fluid to the passage, and an inlet frame wherein the compressor section is positioned at the outlet end of inlet frame. The inlet frame includes an inner wall extended from the inlet end to the outlet end, the inner wall forming at least in part the core flowpath and a cavity. The cavity is positioned inward of the inner wall, and the core flowpath and the cavity are separated by a double wall structure at the inner wall. The double wall structure includes a plenum extended from the inlet end toward the outlet end of the inlet frame. A first opening provides fluid communication between the cavity and the plenum, and a second opening provides fluid communication between the plenum and the core flowpath. The inner wall is configured to receive the first flow of fluid from the compressor section. An outer wall is extended from the inlet end toward the outlet end of the frame. The outer wall forms a passage extended at least partially around the core flowpath, and the outer wall at least partially forms the core flowpath. The outer wall is configured to receive the second flow of fluid from the fluid system, the second flow fluidly separated from the first flow of fluid.

18. The turbo machine of any clause herein, wherein the first flow of fluid is an oxidizer from the compressor section, and wherein the second flow of fluid is a lubricant from the fluid system.

19. The turbo machine of any clause herein, wherein the passage includes one or more windings of the passage extended at least partially circumferentially through the outer wall, wherein the one or more windings includes a first winding positioned at the inlet end of the inlet frame and a second winding positioned distal to the first winding, the first winding configured to receive the second flow of fluid before the second winding.

20. The turbo machine of any clause herein, the inlet frame forming an inlet port and an outlet port at the outer wall each in fluid communication with the passage. The inlet port is configured to receive the second flow of fluid into the passage from the fluid system, and the outlet port is configured to egress the second flow of fluid from the outer wall.

21. A turbo machine including the frame of any preceding clause.

22. A frame for a heat engine, the frame including an inner wall extended from an inlet end to an outlet end. The inner wall forms at least in part a core flowpath, the inner wall including a plenum defined between an outer portion of the inner wall and an inner portion of the inner wall. A cavity is defined inward of the inner portion of the inner wall, and the inner wall forms a first plenum opening providing fluid communication between the cavity and the plenum, and wherein the inner wall forms a second plenum opening providing fluid communication between the plenum and the core flowpath.

23. The frame of any clause herein, the frame including a plenum wall extended within the plenum between the outer portion and the inner portion of the inner wall.

24. The frame of any clause herein, wherein the plenum wall is extended co-directional to the inner wall.

25. The frame of any clause herein, wherein the inner wall forms a collector cavity within the plenum positioned upstream or downstream of the plenum wall.

26. The frame of any clause herein, wherein the inner wall forms a high pressure region between the plenum wall, the outer portion, and the inner portion, the high pressure region positioned upstream or downstream of the collector cavity.

27. The frame of any clause herein, wherein the high pressure region includes a cross sectional area less than the collector cavity.

28. The frame of any clause herein, wherein the first plenum opening is formed through the inner portion in direct fluid communication with the high pressure region.

29. The frame of any clause herein, wherein the first plenum opening is formed through the inner portion in direct fluid communication with the collector cavity.

30. The frame of any clause herein, wherein the second plenum opening is formed through the outer portion in direct fluid communication with the collector cavity.

31. The frame of any clause herein, wherein the collector cavity includes an aft collector positioned aft of a plenum wall, wherein the second plenum opening is formed through the outer portion at the aft collector.

32. The frame of any clause herein, wherein the collector cavity includes a forward collector positioned forward of a plenum wall, wherein the first plenum opening is formed through the inner portion at the forward collector.

33. The frame of any clause herein, wherein the forward collector is positioned at the inlet end of the frame.

34. The frame of any clause herein, the frame including an outer wall extended from the inlet end toward the outlet end of the frame, wherein the outer wall and the inner wall together form the core flowpath, the outer wall forming a passage extended at least partially around the core flowpath, the outer wall at least partially defining the core flowpath.

35. The frame of any clause herein, wherein the inner wall is configured to receive a first flow of fluid and the outer wall is configured to receive a second flow of fluid different from the first flow of fluid.

36. The frame of any clause herein, wherein the second flow of fluid is a lubricant, a fuel, a hydraulic fluid, or combinations thereof, and wherein the first flow of fluid is an oxidizer.

37. The frame of any clause herein, the outer portion including an inner surface, wherein the inner surface includes a turbulator structure.

38. The frame of any clause herein, wherein the outer portion of the inner wall is twice as thick or greater as the inner portion of the inner wall.

39. A heat engine, the heat engine including the frame of any preceding clause.

40. A heat engine, the heat engine including a frame, the frame including an inner wall extended from an inlet end to an outlet end. The inner wall forms at least in part a primary flowpath and a plenum is formed between an outer portion of the inner wall and an inner portion of the inner wall. A cavity is formed inward of the inner portion of the inner wall. The inner wall forms a first plenum opening providing fluid communication between the cavity and the plenum. The inner wall forms a second plenum opening providing fluid communication between the plenum and the primary flowpath.

41. The heat engine of any clause herein, wherein the inner wall forms a collector cavity within the plenum positioned forward or aft of a plenum wall, and wherein the second plenum opening is formed through the outer portion of the inner wall in direct fluid communication with the collector cavity aft of the plenum wall.

42. The heat engine of any clause herein, the frame including an outer wall extended from the inlet end toward the outlet end of the frame. The outer wall and the inner wall together form the core flowpath. The outer wall forms a passage extended at least partially around the core flowpath and at least partially forms the core flowpath.

43. A turbo machine, the turbo machine comprising an inner wall extended from an inlet end to an outlet end, the inner wall comprising a double wall structure, wherein a plenum is formed within the double wall structure, and wherein the double wall structure comprises an opening configured to provide fluid communication of a first flow of fluid between the plenum through the double wall structure. An outer wall is extended from the inlet end toward the outlet end, the outer wall forming a passage within the outer wall. The outer wall is configured to receive a second flow of fluid, the second flow fluidly separated from the first flow of fluid. The inner wall and the outer wall together form a flowpath between the inner wall and the outer wall. A flowpath structure is formed at least in part within the inner wall. The flowpath structure is configured to receive a third flow of fluid therethrough. The third flow of fluid is separate from the first flow of fluid. The flowpath structure includes an exit opening configured to provide fluid communication from the flowpath structure to the flowpath.

44. The turbo machine of any clause herein, wherein the flowpath comprises a radial span, and wherein the exit opening of the flowpath structure is positioned within the radial span.

45. The turbo machine of any clause herein, the turbo machine including a downstream structure positioned downstream of the exit opening. The exit opening is positioned upstream in line-of-sight relative to the downstream structure.

46. The turbo machine of any clause herein, wherein the downstream structure is a compressor section.

47. The turbo machine of any clause herein, wherein the downstream structure is a compressor vane of the compressor section.

48. The turbo machine of any clause herein, wherein the inner wall comprises a radial portion, and wherein the exit opening is positioned at the radial portion of the inner wall.

49. The turbo machine of any clause herein, wherein the flowpath structure comprises a nozzle portion positioned at the exit opening.

50. The turbo machine of any clause herein, wherein the nozzle portion comprises a vane structure configured to provide a swirled flow of the third flow of fluid.

51. The turbo machine of any clause herein, wherein the first flow of fluid is an oxidizer, the second flow of fluid is one or more of a lubricant, a fuel, or a hydraulic fluid, and wherein the third flow of fluid within the flowpath structure is a fluidly separate from the first flow of fluid and the second flow of fluid.

52. The turbo machine of any clause herein, wherein the third flow of fluid is a cleaning solution.

53. The turbo machine of any preceding clause, the turbo machine comprising the frame of any preceding clause.

54. A frame for a heat engine, the frame including an inner wall at least partially forming a primary flowpath, the inner wall at least partially forming a flowpath structure within the inner wall, the flowpath structure configured to receive a flow of fluid therethrough. The flow of fluid in the flowpath structure is separate from a flow of fluid through the primary flowpath. The flowpath structure includes an exit opening configured to provide fluid communication from the flowpath structure to the primary flowpath.

55. The frame of any clause herein, wherein the primary flowpath comprises a radial span, and wherein the exit opening of the flowpath structure is positioned radially within the radial span of the primary flowpath.

56. The frame of any clause herein, wherein the inner wall comprises a radial portion, and wherein the exit opening is positioned at the radial portion of the inner wall.

57. The frame of any clause herein, wherein the flowpath structure comprises a nozzle portion positioned at the exit opening.

58. The frame of any clause herein, wherein the nozzle portion comprises a vane structure configured to provide a swirled flow of the flow of fluid through the exit opening into the primary flowpath.

59. A turbo machine including the frame of any preceding clause.

60. A turbo machine, the turbo machine forming a flowpath extended therethrough, the turbo machine including a compressor section comprising a compressor vane and a compressor rotor, and a frame positioned upstream of the compressor section. The flowpath is extended through the frame and the compressor section. The frame includes an internal flowpath structure configured to receive a flow of fluid therethrough. The flowpath structure forms an exit opening positioned within a radial span of the flowpath. The exit opening is configured to provide the flow of fluid from the flowpath structure to the compressor section downstream of the exit opening at the frame.

61. The turbo machine of any clause herein, the frame including a plurality of hollow cores positioned between a strut at the frame, wherein the plurality of hollow cores is fluidly separated from one another.

62. The turbo machine of any clause herein, wherein the flowpath structure is formed at least in part at one of the cores.

63. The turbo machine of any clause herein, wherein the exit opening is positioned upstream in line-of-sight relative to the compressor section.

64. The turbo machine of any clause herein, wherein the flowpath structure includes a nozzle portion positioned at the exit opening, wherein the nozzle portion is configured to provide a swirled flow of fluid to the compressor section.

65. The frame of any preceding clause, wherein one or more of the plurality of hollow cores is defined between walls of the strut.

66. The frame of any preceding clause, wherein the wall at the hollow core is at least 1000 µm thick.

67. The frame of any preceding clause, wherein the wall is between 1000 µm and 2000 µm thick.

68. The frame of any preceding clause, wherein the wall is between 1200 µm and 1900 µm thick.

69. The frame of any preceding clause, wherein the plurality of hollow cores is fluidly segregated from one another.

70. The frame of any preceding clause, wherein the plurality of hollow cores is defined between an outer surface of the outer wall and an outer radius of the primary flowpath.

71. The frame of any preceding clause, comprising at least four fluidly segregated passages.

72. The frame of any preceding clause, comprising sixteen or fewer fluidly segregated passages.

73. The frame of any preceding clause, comprising at least eleven fluidly segregated passages.

74. The frame of any preceding clause, wherein the plurality of hollow cores forms a plurality of fluidly segregated passages.

75. The frame of any preceding clause, wherein the plurality of hollow cores comprises two or more scavenges passages, two or more supply passages, two or more services passages, and two or more thermal management passages.

76. The frame of any preceding clause, wherein the plurality of hollow cores is positioned axially aft of a splitter, the splitter separating the core flowpath into a primary flowpath and a secondary flowpath.

77. The frame of any preceding clause, wherein the plurality of hollow cores is formed between a wall of a strut, a first wall defining an outer radius of the primary flowpath, and an outer wall of the frame at the strut.

What is claimed is:

1. A frame for a heat engine, the frame comprising:
   an inner wall extended from an inlet end to an outlet end, the inner wall forming at least in part a core flowpath, the inner wall comprising a plenum formed between an outer portion of the inner wall and an inner portion of the inner wall, wherein a cavity is formed inward of the inner portion of the inner wall, and wherein the inner wall comprises a first plenum opening providing fluid communication between the cavity and the plenum, and wherein the inner wall comprises a second plenum opening providing fluid communication between the plenum and the core flowpath,
   wherein the outer portion comprises an inner surface, wherein the inner surface comprises a turbulator structure.

2. The frame of claim 1, the frame comprising a plenum wall extended within the plenum between the outer portion and the inner portion of the inner wall.

3. The frame of claim 2, wherein the plenum wall is extended codirectional to the inner wall.

4. The frame of claim 2, wherein the inner wall defines a collector cavity within the plenum positioned upstream or downstream of the plenum wall.

5. The frame of claim 4, wherein the inner wall comprises a high pressure region between the plenum wall, the outer portion, and the inner portion, the high pressure region positioned upstream or downstream of the collector cavity.

6. The frame of claim 5, wherein the high pressure region comprises a cross sectional area less than the collector cavity.

7. The frame of claim 5, wherein the first plenum opening is formed through the inner portion in direct fluid communication with the high pressure region.

8. The frame of claim 4, wherein the first plenum opening is formed through the inner portion in direct fluid communication with the collector cavity.

9. The frame of claim 4, wherein the second plenum opening is formed through the outer portion in direct fluid communication with the collector cavity.

10. The frame of claim 9, wherein the collector cavity comprises an aft collector positioned aft of a plenum wall, wherein the second plenum opening is formed through the outer portion at the aft collector.

11. The frame of claim 4, wherein the collector cavity comprises a forward collector positioned forward of a plenum wall, wherein the first plenum opening is formed through the inner portion at the forward collector.

12. The frame of claim 11, wherein the forward collector is positioned at the inlet end of the frame.

13. The frame of claim 1, comprising:
an outer wall extended from the inlet end toward the outlet end of the frame, wherein the outer wall and the inner wall together define the core flowpath, the outer wall forming a passage extended at least partially around the core flowpath, the outer wall at least partially forming the core flowpath.

14. The frame of claim 13, wherein the inner wall is configured to receive a first flow of fluid and the outer wall is configured to receive a second flow of fluid different from the first flow of fluid.

15. The frame of claim 14, wherein the second flow of fluid is a lubricant, a fuel, a hydraulic fluid, or combinations thereof, and wherein the first flow of fluid is an oxidizer.

16. The frame of claim 1, wherein the outer portion of the inner wall is twice as thick or greater as the inner portion of the inner wall.

17. A heat engine, the heat engine comprising:
a frame comprising:
(i) an inner wall extended from an inlet end to an outlet end, the inner wall forming at least in part a core flowpath, the inner wall comprising a plenum formed between an outer portion of the inner wall and an inner portion of the inner wall, wherein a cavity is formed inward of the inner portion of the inner wall, and wherein the inner wall comprises a first plenum opening providing fluid communication between the cavity and the plenum, and wherein the inner wall comprises a second plenum opening providing fluid communication between the plenum and the core flowpath; and
(ii) an outer wall extended from the inlet end toward the outlet end of the frame, wherein the outer wall and the inner wall together define the core flowpath, the outer wall forming a passage extended at least partially around the core flowpath, the outer wall at least partially forming the core flowpath,
wherein the inner wall is configured to receive a first flow of fluid and the outer wall is configured to receive a second flow of fluid different from the first flow of fluid, and
wherein the second flow of fluid is a lubricant, a fuel, a hydraulic fluid, or combinations thereof, and wherein the first flow of fluid is an oxidizer.

18. The heat engine of claim 17, wherein the inner wall defines a collector cavity within the plenum positioned forward or aft of a plenum wall, wherein the second plenum opening is formed through the outer portion of the inner wall in direct fluid communication with the collector cavity aft of the plenum wall.

19. A frame for a heat engine, the frame comprising:
an inner wall extended from an inlet end to an outlet end, the inner wall forming at least in part a core flowpath, the inner wall comprising a plenum formed between an outer portion of the inner wall and an inner portion of the inner wall, wherein a cavity is formed inward of the inner portion of the inner wall, and wherein the inner wall comprises a first plenum opening providing fluid communication between the cavity and the plenum, and wherein the inner wall comprises a second plenum opening providing fluid communication between the plenum and the core flowpath,
wherein the outer portion of the inner wall is twice as thick or greater as the inner portion of the inner wall.

* * * * *